United States Patent
Kanamoto

(10) Patent No.: US 9,977,630 B2
(45) Date of Patent: May 22, 2018

(54) IMAGE FORMING APPARATUS HAVING A FOLDER ACCESSIBLE FROM AN EXTERNAL APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Yoshiji Kanamoto, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/064,308

(22) Filed: Mar. 8, 2016

(65) Prior Publication Data
US 2016/0266851 A1    Sep. 15, 2016

(30) Foreign Application Priority Data
Mar. 9, 2015  (JP) .................. 2015-046433

(51) Int. Cl.
| | |
|---|---|
| G06F 15/00 | (2006.01) |
| G06K 1/00 | (2006.01) |
| G06K 15/00 | (2006.01) |
| G06F 3/12 | (2006.01) |
| H04N 1/00 | (2006.01) |

(52) U.S. Cl.
CPC ............ G06F 3/1206 (2013.01); G06F 3/122 (2013.01); G06F 3/127 (2013.01); G06F 3/1227 (2013.01); G06F 3/1228 (2013.01); G06F 3/1292 (2013.01); H04N 1/00233 (2013.01); H04N 1/00944 (2013.01); *H04N 2201/0012* (2013.01); *H04N 2201/0094* (2013.01)

(58) Field of Classification Search
CPC ...... G06F 3/1206; G06F 3/1227; G06F 3/127; G06F 3/1292; H04N 1/00944; H04N 1/00233; H04N 2201/0094
USPC ............................ 358/1.1, 1.14, 1.15, 1.16
See application file for complete search history.

(56) References Cited

U.S. PATENT DOCUMENTS

| | | | | |
|---|---|---|---|---|
| 2008/0239387 A1* | 10/2008 | Otsuka | .................. | G06F 3/1204 358/1.15 |
| 2014/0268208 A1* | 9/2014 | Hirakata | ............ | H04N 1/00875 358/1.14 |
| 2015/0033293 A1* | 1/2015 | Nishida | ................. | G06F 21/608 726/4 |
| 2016/0077475 A1* | 3/2016 | Ehara | ................. | G03G 15/2039 399/88 |
| 2016/0077777 A1* | 3/2016 | Kobayashi | ............ | G06F 3/1205 358/1.15 |

FOREIGN PATENT DOCUMENTS

JP    2012-118736 A    6/2012

* cited by examiner

*Primary Examiner* — Douglas Tran
(74) *Attorney, Agent, or Firm* — Canon U.S.A., Inc. IP Division

(57) ABSTRACT

An image forming apparatus capable of communicating with an external apparatus includes a storage unit having a folder, a setting unit configured to set a printing condition corresponding to the folder, and a printing unit configured to print a printing target file transmitted from the external apparatus and stored in the folder based on the printing condition set by the setting unit.

18 Claims, 17 Drawing Sheets

FIG.13

```
<?xml version="1.0" encoding="UTF-8"?>
<JDF ID="ID01" JobPartID="JobPartID01" Type="Combined" Activation="Active" Status="Ready"
Types="LayoutPreparation Imposition Interpreting Rendering DigitalPrinting"
Version="1.2" Category="DigitalPrinting" MaxVersion="1.2" xmlns="http://www.CIP4.org/JDFSchema_1_1"
JobID="JobID01" DescriptiveName="Sample 01">

<ResourcePool>
  <RunList Class="Parameter" ID="IDRL" Status="Available" PartIDKeys="Run"/>
  <LayoutPreparationParams Class="Parameter" ID="IDLPP" Status="Available" Sides="OneSidedFront"/>
  <InterpretingParams Class="Parameter" ID="IDIP" Status="Available"/>
  <RenderingParams Class="Parameter" ID="IDRP" Status="Available" />
  <DigitalPrintingParams Class="Parameter" ID="IDDPP" Status="Available" Collate="SheetSetAndJob">
      <MediaRef rRef="MED_000"/>
  </DigitalPrintingParams>
  <Component Class="Quantity" ID="IDC" ComponentType="FinalProduct" Status="Unavailable"/>

<Media ID="MED_000" Class="Consumable" Status="Available" Dimension="842 595">
      <Location LocationName="AutoSelect"/>
  </Media>

</ResourcePool>

<ResourceLinkPool>
  <LayoutPreparationParamsLink rRef="IDLPP" Usage="Input" CombinedProcessIndex="0"/>
  <RunListLink rRef="IDRL" Usage="Input" CombinedProcessIndex="0 1"/>
  <InterpretingParamsLink rRef="IDIP" Usage="Input" CombinedProcessIndex="2"/>
  <RenderingParamsLink rRef="IDRP" Usage="Input" CombinedProcessIndex="3"/>
  <DigitalPrintingParamsLink rRef="IDDPP" Usage="Input" CombinedProcessIndex="4"/>
  <ComponentLink rRef="IDC" Usage="Output" CombinedProcessIndex="4"/>
</ResourceLinkPool>
</JDF>
```

FIG. 14

FILE BROWSER

| | | | |
|---|---|---|---|
| COMPUTER | | | |
| LOCAL DISK (C) | | | |
| LOCAL DISK (F) | | | |
| NETWORK | | | |
| 172.24.123.123 | | | |
| share | | | |
| folder | | | |
| myfolder | | | |

1201

| NAME | UPDATED DATE | TYPE | SIZE |
|---|---|---|---|
| IHF_completed | 2015/2/17 | FOLDER | |
| IHF_error | 2015/2/17 | FOLDER | |
| IHF_printing | 2015/2/17 | FOLDER | |
| Template.jdf | 2015/2/17 | JDF FILE | 3 KB |
| Sample.pdf | 2011/1/1 | PDF FILE | 100 KB |

1401

IMAGE FORMING APPARATUS HAVING A FOLDER ACCESSIBLE FROM AN EXTERNAL APPARATUS, CONTROL METHOD OF IMAGE FORMING APPARATUS, AND STORAGE MEDIUM

BACKGROUND

Field of the Disclosure

The present disclosure relates to an image forming apparatus that executes print processing of a printing target file transmitted from a client apparatus via a network.

Description of the Related Art

Conventionally, a method using a hot folder has been known as a method for causing an image forming apparatus such as a copying machine or a printer to execute print processing (see, Japanese Patent Application Laid-Open No. 2012-118736). In the method, a hot folder application is installed on a client apparatus. When a file is stored in a hot folder, print data is transferred to a printer to execute print processing.

By using the hot folder application installed on the client apparatus, an operator can instruct the image forming apparatus to execute print processing of a printing target file through a relatively simple operation of storing the file. Therefore, for example, in a case where the operator would like to print a large volume of print data (file) in a same setting, it is possible to eliminate a troublesome operation which requires a user to give printing instructions for respective files through a printer driver application. Accordingly, it is possible to improve efficiency in a routine printing operation.

In the method using the hot folder described in the conventional technique, a highly-functional application such as the hot folder application has to be provided on the client apparatus. This is because the client apparatus needs a program that enables the client apparatus to make a print setting on a printing target file, convert the printing target file into a unique data format readable by the copying machine or the printer as necessary, and transmit the converted printing target file to the copying machine or the printer. Inevitably, the above-described program is specific to an operating system on which the program runs or an application platform provided on that operating system.

In addition, the printing system using the hot folder application provided on the client apparatus is in nature dependent on the operating system of the client apparatus. Further, there may be a case where the user has to be provided with the updated hot folder application when the version of the operating system is updated.

Furthermore, in recent years, there has been an increased demand in the mobile terminals known as tablets and smartphones to serve as the client apparatuses. With respect to these mobile terminals, an operation environment of the program is provided by each of the operating systems unique thereto. There has also been an increased demand in these mobile terminals for a function to instruct the copying machine or the printer to execute print processing. However, in order to provide the above-described mobile terminals with the program that enables the mobile terminals to issue printing instructions, a large amount of development cost will be necessary for a vender who develops the copying machine or the printer.

SUMMARY

The present disclosure is directed to a method that enables a client apparatus to easily instruct an image forming apparatus such as a copying machine or a printer to execute print processing without using a highly-functional application. Further, the present invention is directed to a print processing method less dependent on the operating system or the execution environment of the application, which enables the client apparatus to instruct print processing without using the highly-functional application.

According to an aspect of the present invention, an image forming apparatus capable of communicating with an external apparatus includes a storage unit having a folder, a setting unit configured to set a printing condition corresponding to the folder, and a printing unit configured to print a printing target file transmitted from the external apparatus and stored in the folder, based on the printing condition set by the setting unit.

According to the present invention, the print processing method can be configured to be less dependent on the operating system of the external apparatus. Therefore, it is possible to easily provide the various client apparatuses with a printing environment.

Further features of the present invention will become apparent from the following description of exemplary embodiments with reference to the attached drawings.

BRIEF DESCRIPTION OF THE DRAWINGS

FIG. 13 is a diagram illustrating an example of a printing specification file in which a printing condition corresponding to the hot folder is described.

FIG. 14 is a diagram illustrating a state where a printing target file is copied to the hot folder from the client apparatus.

DESCRIPTION OF THE EMBODIMENTS

Hereinafter, an exemplary embodiment of the present invention will be described in detail with reference to the appended drawings. Further, the embodiments described hereinafter are not intended to limit the content of the invention as described in the appended claims, and not all of the combinations of features described in the exemplary embodiments are required as the solutions of the present invention.

First, a first exemplary embodiment will be described.

Figure 1:
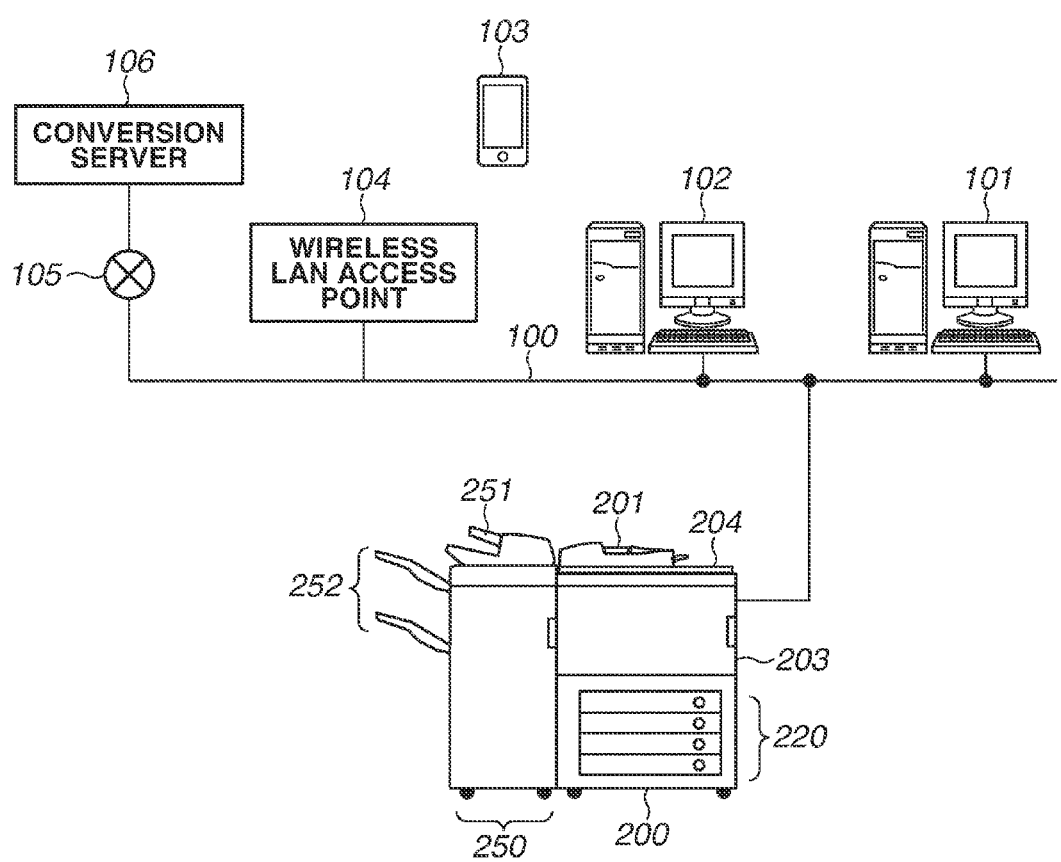
FIG. 1 is a block diagram illustrating a print processing system.

FIG. 1 is a block diagram illustrating a print processing system according to the present exemplary embodiment. In the present exemplary embodiment, a multifunction peripheral (MFP) 200 will be described as an example of an image forming apparatus. Personal computers (PCs) 101, 102, and a mobile terminal 103 will be described as examples of a client apparatus and an external apparatus. The MFP 200 and the PC 101 are communicably connected to each other via a network 100.

Further, similar to the PC 101, the PC 102 serving as another client apparatus is communicably connected to the MFP 200 via the network 100. The PCs 101 and 102 may be operated on different operating systems. Alternatively, the PCs 101 and 102 may be operated on the identical operating systems of different versions. In the present exemplary embodiment, it is assumed that various application execution environments with respect to the client apparatuses are mixed in an environment of the printing system.

Further, a wireless local area network (LAN) access point 104 is connected to the network 100. The wireless LAN access point 104 enables the mobile terminal 103 illustrated in FIG. 1 and other devices of various types that are not illustrated in FIG. 1 to communicate with each other through the wireless LAN. In other words, according to the present exemplary embodiment, a printing environment equivalent to that of the client apparatus such as the PC 101 or 102 can be provided by other device types such as the mobile terminal 103.

The above-described type mobile terminals have spread rapidly and diversified remarkably. Further, along with the spread of such highly-portable terminals, for example, there may be a case where the client apparatus of a user who wishes the MFP 200 placed on the network 100 in FIG. 1 to execute printing is a device brought from a public environment.

A conversion server 106 placed on the outside of the LAN such as a cloud environment is also communicably connected to the network 100 via the internet 105. The conversion server 106 has a function of converting a printing target file of a file format that is not directly printable by the MFP 200, into a file format directly printable thereby. Based on a request from the MFP 200, the conversion server 106 converts a file into a format printable by the MFP 200 and transmits the converted file to the MFP 200.

In FIG. 1, the conversion server 106 is arranged on the outside of the network 100 via the network 105 as an example. However, naturally, the conversion server 106 may be directly connected to the network 100.

First, the PCs 101, 102, and the mobile terminal 103 serving as the client apparatuses will be described. It is assumed that the PCs 101, 102, or the mobile terminal 103 includes a network file sharing unit using a file sharing protocol such as the Server Message Block (SMB) or the Web-based Distributed Authoring and Versioning (WebDAV), which has been normally included in the recent operating system. Protocols such as the SMB and the WebDAV are examples of the file sharing protocols.

By using the file sharing protocol such as the SMB or the WebDAV, the PCs 101, 102, and the mobile terminal 103 connected to the network 100 can mutually transmit, receive, or share the file. Accordingly, the PCs 101, 102, and the mobile terminal 103 can transmit the printing target file to the MFP 200 by using the network file sharing protocol. With this configuration, the operator can make the MFP 200 execute print processing without providing the client apparatus with an application that is highly dependent on the operating system.

However, the PCs 101, 102, and the mobile terminal 103 may include the above-described printing application program.

Figure 2:
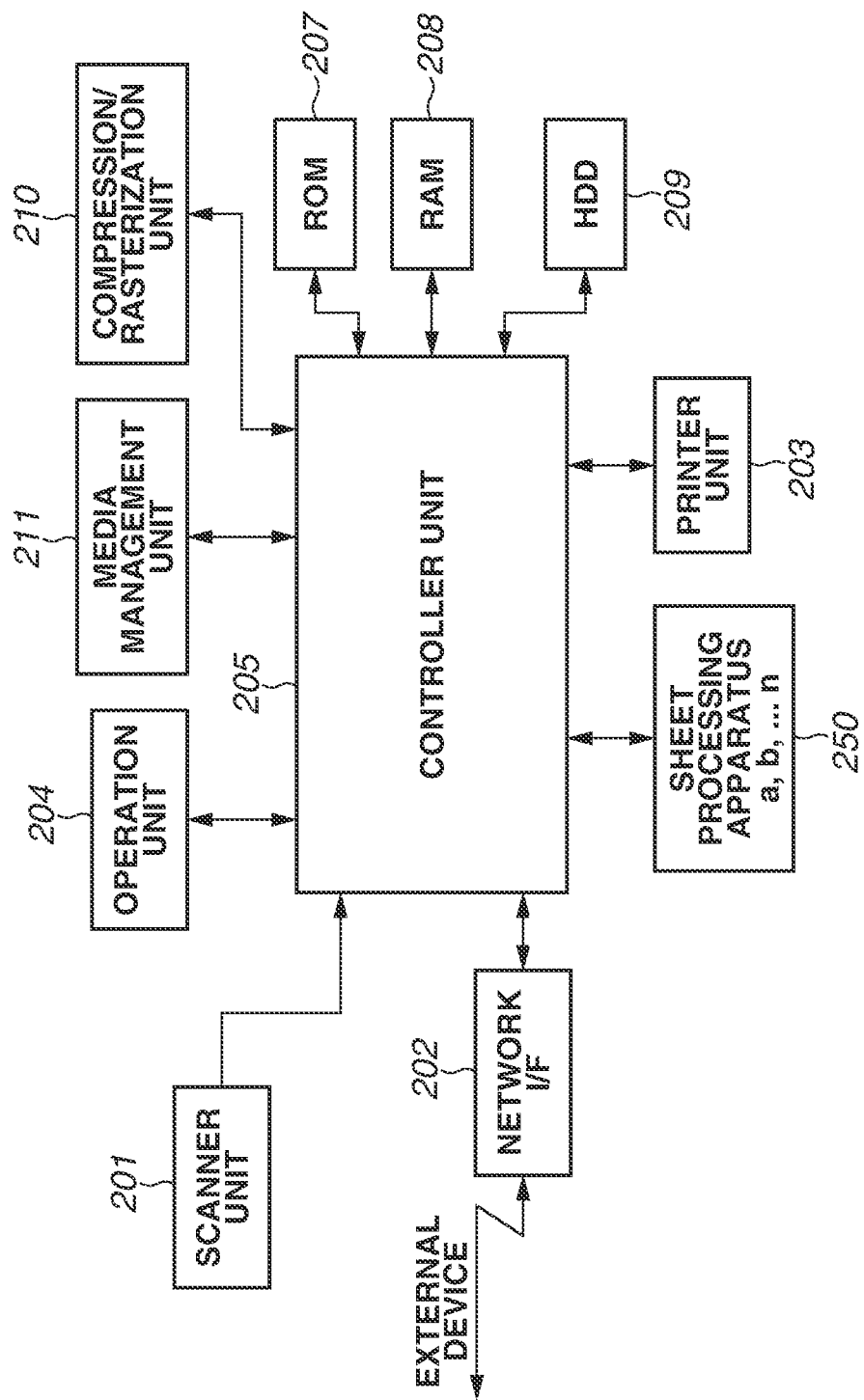
FIG. 2 is a block diagram illustrating a hardware configuration of a multifunction peripheral.

FIG. 2 is a block diagram illustrating a hardware configuration of the MFP 200. The MFP 200 includes a reading function of reading an image on a sheet and a printing function of printing an image on a sheet. Further, the MFP 200 includes a post-processing function of binding a plurality of sheets on which images are printed, sorting a plurality of sheets, and dividing discharge destinations of a plurality of sheets into a plurality of trays. In addition, the sheets include various paper such as normal paper, heavy paper, and an overhead projector (OHP) sheet.

Further, the MFP 200 includes a file sharing function accessible from the client apparatuses such as the PCs 101, 102, and the mobile terminal 103. The file sharing function will be described below.

A printer unit 203 conveys a medium stored in a sheet feeding unit 220 and forms an image of rasterized image data on the medium by using toner. A general configuration and an operation principle of the printer unit 203 will be described below.

For example, a light beam such as a laser beam that is modulated according to the image data is incident on a rotating polygon mirror (i.e., polygon mirror) and radiated to a photosensitive drum via a reflection mirror as reflected scanning light. A latent image formed on the photosensitive drum through the laser beam is developed with toner, and a toner image is transferred onto a sheet (i.e., medium) adhering to a transfer drum. A series of the image forming processing described above is sequentially executed with color toners of yellow (Y), magenta (M), cyan (C), and black (K), so that a full-color image is formed thereon. In addition to the toner images of these four colors, a toner image developed with additional toner such as "spot color" or "transparent toner" may be also transferable thereon.

The sheet on the transfer drum on which the full-color image is formed is conveyed to a fixing unit. The fixing unit is composed of a combination of a roller and a belt and provided with a heat source such as a halogen heater. Therefore, toner of the toner image transferred onto the sheet is fused and fixed with heat and pressure.

In addition, the MFP 200 according to the present exemplary embodiment is provided with a scanner unit 201 and an operation unit 204. The operation unit 204 is arranged on an upper face of the MFP 200. The operation unit 204 provides various interfaces that allow an operator to execute various settings and operations on the MFP 200.

Various accompanying apparatuses can be attached to the MFP 200. In the present exemplary embodiment, a sheet processing apparatus is described as an example of the accompanying apparatus.

A sheet processing apparatus 250 executes various processing on the media on which images are formed by the printer unit 203 in order to acquire print products. Herein, the various processing include staple binding processing in which a bundle of media conveyed to the sheet processing apparatus 250 is bound with a stapler at the end portion thereof. Further, the various processing also includes bookbinding in which a bundle of media conveyed to the sheet processing apparatus 250 is bound with a stapler at the central portion thereof and folded along the stapler. In addition, the various processing includes staple-less binding in which a bundle of media conveyed to the sheet processing apparatus 250 is bound at the end portion thereof with pressure applied from a toothed mark. Furthermore, the various processing includes sheet-punching in which a hole is made at an end portion of media conveyed to the sheet processing apparatus 250.

The sheet processing apparatus 250 includes an inserter 251. The inserter 251 has a function of inserting a medium stored in the inserter 251 into the media conveyed from the printer unit 203 at a proper timing based on the setting. The inserter 251 can insert the medium that does not require print processing into the printed media.

An output tray 252 constitutes a tray portion where the output documents processed by the sheet processing apparatus 250 are discharged and stacked.

The MFP 200 includes a non-volatile memory such as a hard disk 209 (hereinafter, also referred to as "HDD 209") capable of storing data of a plurality of jobs as processing targets. In the present exemplary embodiment, although a hard disk is employed as a storage device, a large volume non-volatile storage device of the similar sort can be also employed instead of the hard disk.

The MFP 200 further includes a copy function by which the job data received from the scanner unit 201 provided in the MFP 200 is printed by the printer unit 203 via the HDD 209. Further, the MFP 200 includes a printing function by which the job data received from the client apparatus via a network interface (I/F) 202 is printed by the printer unit 203 via the HDD 209. In other words, the MFP 200 is a multifunction-type apparatus that includes a plurality of functions described above.

In addition, the MFP 200 may be a printing apparatus capable of executing color print processing or monochromatic print processing, as long as various control processing described in the present exemplary embodiment can be executed thereby.

The MFP 200 includes the scanner unit 201 for reading a document image and processing the read image data. Further, the MFP 200 includes the network I/F 202 for transmitting and receiving image data to/from a device connected to the network 100. Further, the MFP 200 includes the HDD 209 capable of storing image data of a plurality of jobs as printing targets which are received from any of the scanner unit 201 and the network I/F 202.

Various kinds of management information that are persistently stored in and changed or managed by the MFP 200 are stored in the HDD 209.

Further, the MFP 200 includes the printer unit 203 for printing job data on a printing medium which is a printing target stored in the HDD 209. Furthermore, the MFP 200 includes the operation unit 204 having a display unit as an example, which corresponds to a user interface unit.

Figure 17:
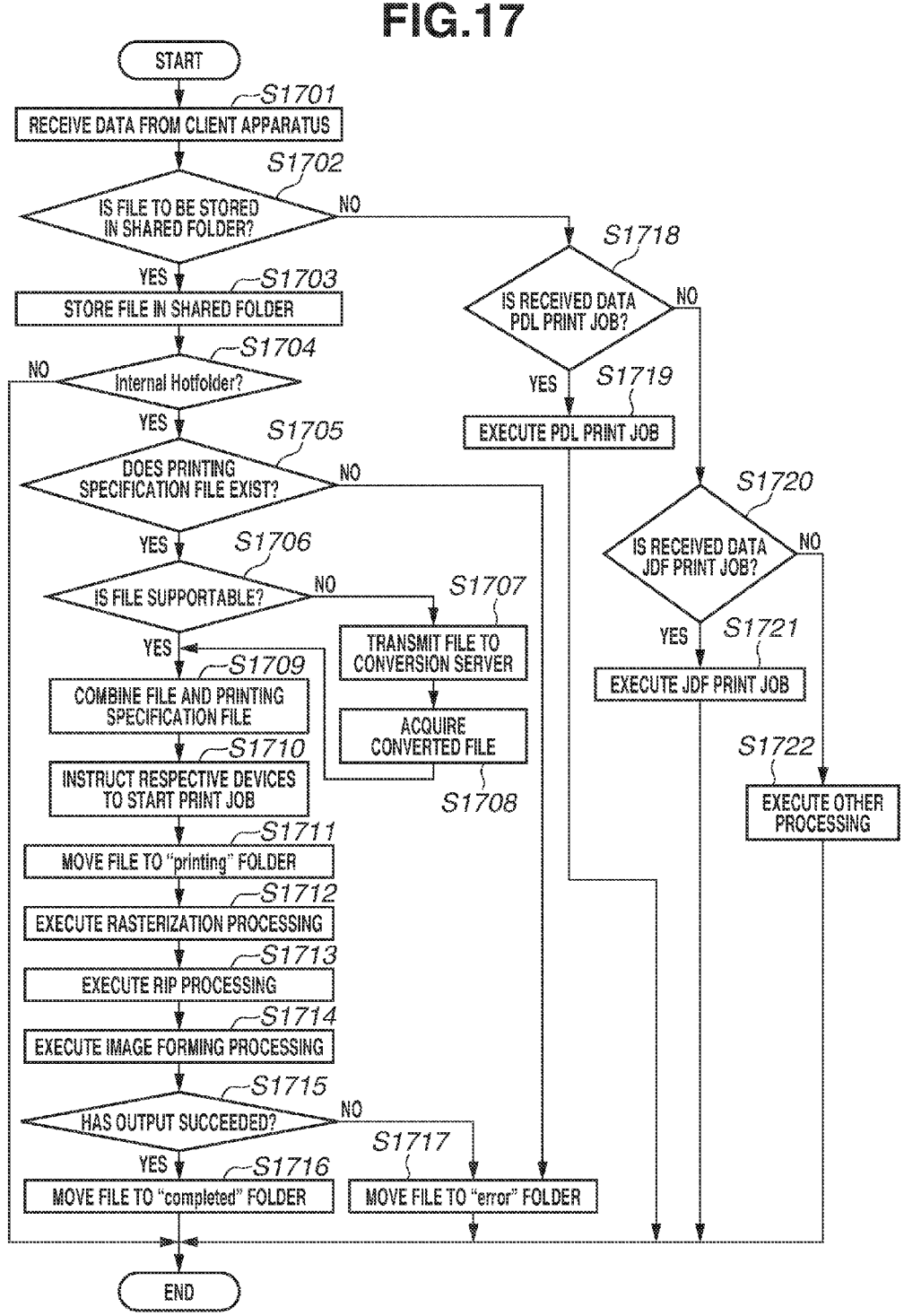
FIG. 17 is a flowchart illustrating a printing operation executed by the multifunction peripheral.

A controller unit (also referred to as "central processing unit (CPU)") 205 comprehensively controls the processing and operations of various units included in the MFP 200. Various control programs necessary for the present exemplary embodiment, which include a program that causes the controller unit 205 to execute various kinds of processing illustrated in a flowchart in FIG. 17, are stored in a read only memory (ROM) 207.

Further, a display control program that causes a display unit of the operation unit 204 to display various user interface screens (hereinafter, referred to as "UI screens") including the UI screens illustrated in the appended drawings is stored in the ROM 207.

The controller unit 205 reads and executes the program stored in the ROM 207 in order to cause the MFP 200 to execute various operations described in the present exemplary embodiment. For example, a portable document format file (PDF) printing function program is stored in the ROM 207. This program causes the MFP 200 to execute an operation for analyzing page description language (PDL) code data received from the external apparatus via the network I/F 202 and rasterizing the analyzed PDL code data into raster image data (i.e., bitmap image data).

The ROM 207 is a read-only memory that previously stores various programs such as programs relating to the boot sequence and font information in addition to the above-described programs. Various programs stored in the ROM 207 will be described below in detail. A random access memory (RAM) 208 is a readable/writable memory that stores image data transmitted from the scanner unit 201 or the network I/F 202, various programs, and setting information.

The HDD 209 is a large volume storage device that stores image data compressed by a compression/rasterization unit 210. The HDD 209 can store pieces of data such as print data of jobs regarded as processing targets. The controller unit 205 controls the printer unit 203 to print the job data via the HDD 209 as a processing target that is input by the input unit such as the scanner unit 201 or the network I/F 202. Further, the controller unit 205 performs control to transmit the job data to the external apparatus via the network I/F 202. As described above, the controller unit 205 performs control to execute various output processing of job data stored in the HDD 209 as a processing target. Further, the controller unit 205 reads and executes the program stored in the ROM 207 in order to realize a function of the file system constructed in the HDD 209, such as sharing the file with the external apparatus or transmitting/receiving the file to/from the external apparatus.

The compression/rasterization unit 210 executes compression and decompression operations of the image data stored in the RAM 208 or the HDD 209 through various compression methods such as the Joint Bi-level Image experts Group (JBIG) and the Joint Photographic Experts Group (JPEG). Through the above-described configuration, the controller unit 205 which is an example of the control unit included in the printing system according to the present exemplary embodiment, also controls the operation of the sheet processing apparatus 250.

A sheet processing apparatus 250 corresponds to the sheet processing apparatus 250 illustrated in FIG. 1. A media management unit 211 is a module for managing the information relating to the type of media processable by the MFP 200.

Figure 3:
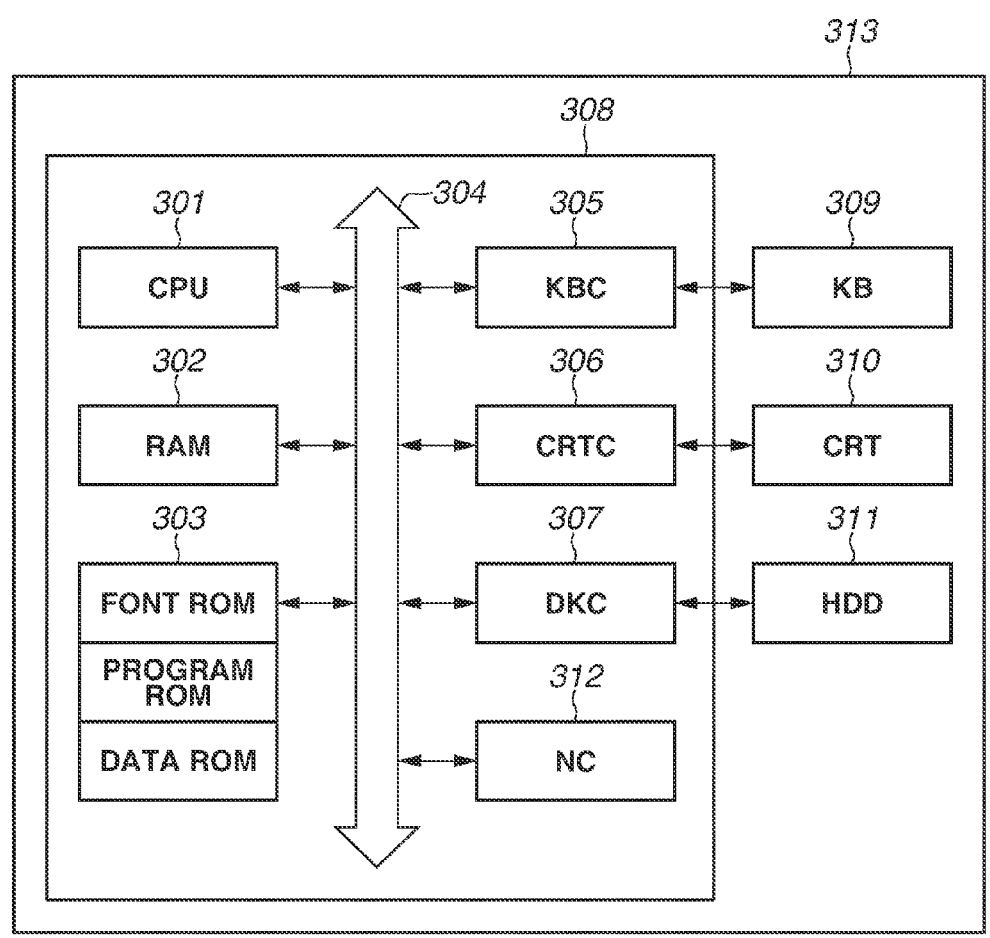
FIG. 3 is a block diagram illustrating a hardware configuration of a client apparatus.

FIG. 3 is a block diagram illustrating a configuration of the client apparatus according to the present exemplary embodiment such as the PCs 101, 102, or the mobile terminal 103 illustrated in FIG. 1.

In FIG. 3, a CPU 301 executes a program such as an operating system (OS) or a general application program stored in a program ROM of a ROM 303 or loaded on a RAM 302 from an HDD 311. Further, the ROM 303 includes a font ROM and a data ROM. The RAM 302 functions as a main memory or a work area of the CPU 301. A keyboard controller (KBC) 305 controls information input through a keyboard 309 or a pointing device (not illustrated). A display controller 306 executes display control with respect to a display unit 310. A disk controller (DKC) 307 controls access to the HDD 311 that stores a boot program, various applications, and font data. A network controller (NC) 312 is connected to the network 100 and executes processing for controlling the communication with another device connected to the network 100. A bus 304 connects the CPU 301, the RAM 302, the ROM 303, and various controllers to each other to transmit a data signal and a control signal.

Moreover, the mobile terminal 103 may include a touch panel controller instead of the KBC 305. Further, the mobile terminal 103 may include a large volume storage device as an alternative to the HDD 311. Furthermore, an internal configuration of the NC 312 may vary depending on whether the apparatus that includes the NC 312 is provided with a wired LAN or a wireless LAN or both. However, the variation of the internal configuration is concealed within the NC 312, and thus the NC 312 is equally configured relative to other modules illustrated in FIG. 3 to control the system.

Figure 4:
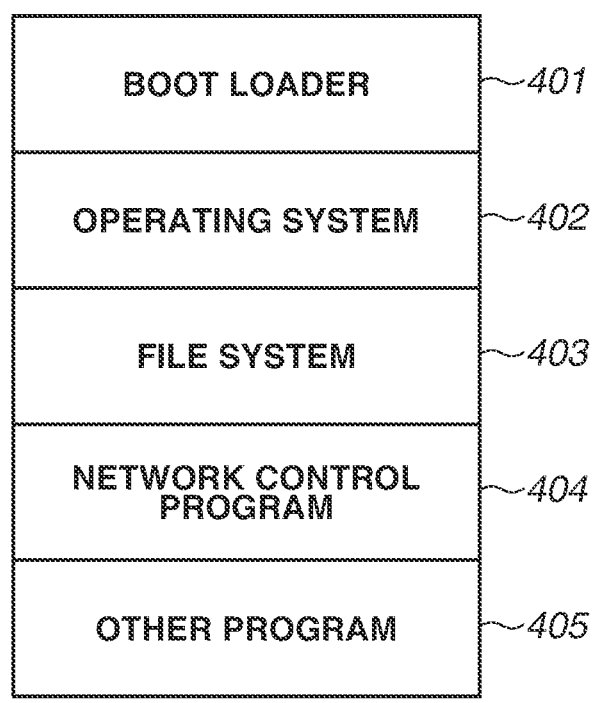
FIG. 4 is a diagram illustrating a software configuration of the client apparatus.

FIG. 4 is a diagram illustrating an example of a configuration of the programs included in the PCs 101, 102, or the mobile terminal 103 serving as the client apparatus.

A boot loader 401 is a program that is executed immediately after power activation of the PCs 101, 102, or the mobile terminal 103. This program includes programs for executing various kinds of activation sequence necessary for system activation.

An operating system 402 is a program for providing an execution environment of various programs that realizes the functions of the PCs 101, 102, or the mobile terminal 103. The operating system 402 provides a function such as management of the resources or the memories of the PCs 101, 102, or the mobile terminal 103, that is, the ROM 303, the RAM 302, and the HDD 311.

A file system 403 is a program that realizes various file management functions such as management of various files stored in the HDD 311, transmission and reception of files to/from the external apparatus, and sharing of files with the external apparatus. The file system 403 accesses a file system provided by the external apparatus connected to the network 100 via the NC 312 and enables transmission, reception, and copying of the file.

A network control program 404 is a program that is executed when data is transmitted or received to/from the device connected thereto via the network 100. The network control program 404 is used when the file system 403 transmits a file as a printing target.

Other programs 405 include a group of programs other than the above-described programs, although detailed description thereof will be omitted.

The above-described file system 403 or the network control program 404 may be provided as a part of the operating system 402. However, even in such a case, the operating system 402 includes merely the units that are equivalent to the functions of the above-described various programs as the alternatives. In other words, as long as the client apparatus includes the above-described functions, the present exemplary embodiment is naturally applicable regardless of whether the operating system 402 includes the above-described various units as the functions of its own.

Figure 5:
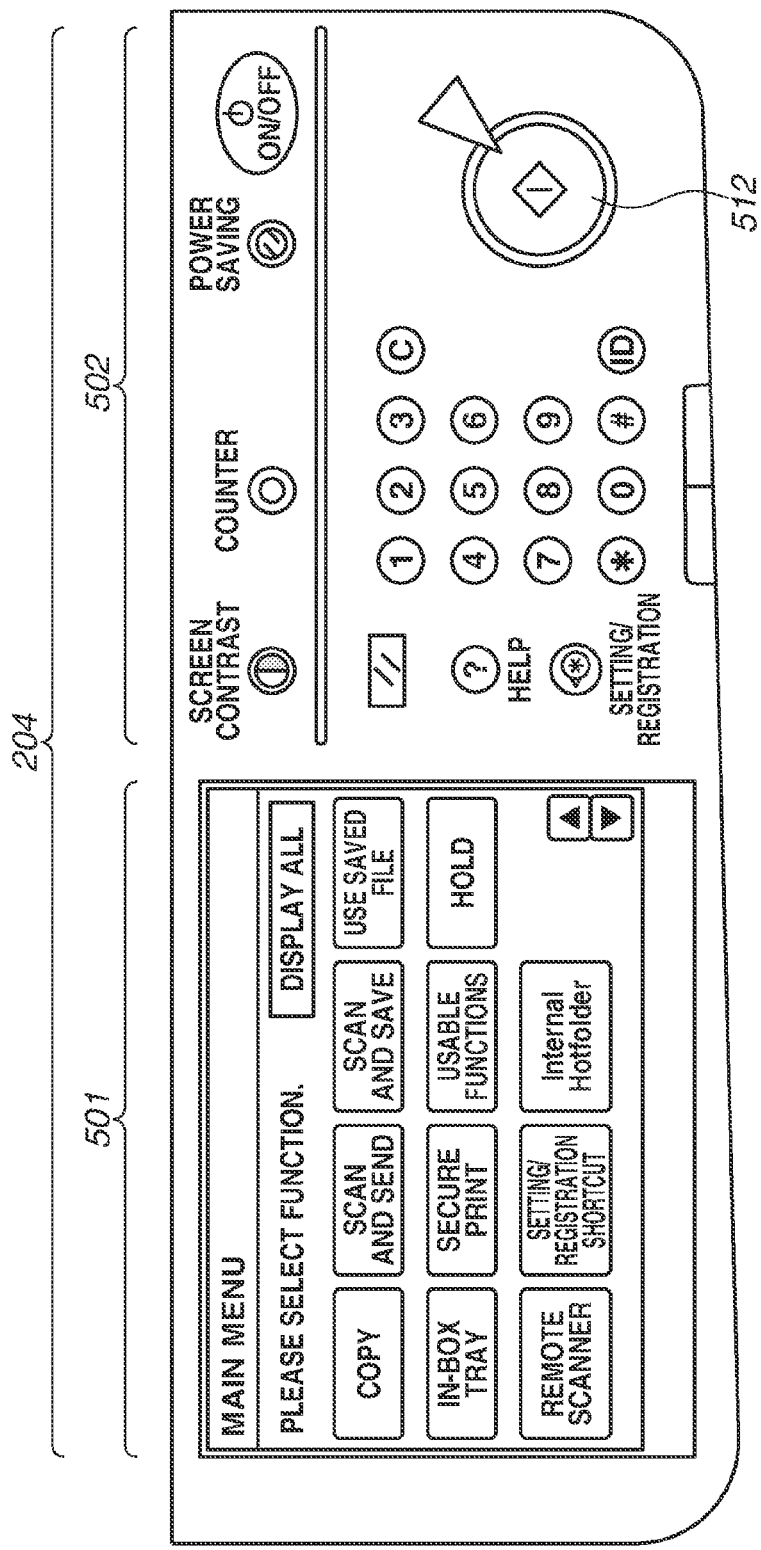
FIG. 5 is a diagram illustrating a configuration of an operation unit.

FIG. 5 is a diagram illustrating an external view of the operation unit 204 included in the MFP 200. The operation unit 204 is configured of a panel 501 on which an operation screen described below is displayed and a hard key input unit 502. For example, the panel 501 may be a touch-panel display. The hard key input unit 502 includes various hard keys including a start button 512. The user inputs an instruction by touching a key displayed on the panel 501 or pressing various hard keys provided on the hard key input unit 502. In addition, the panel 501 may be a display which does not include a touch panel function. In such a case, a scroll key for selecting a key displayed on the panel 501 and an enter key for determining the selected key function may be provided on the hard key input unit 502 in replacement of the touch-key input function.

Figure 6:
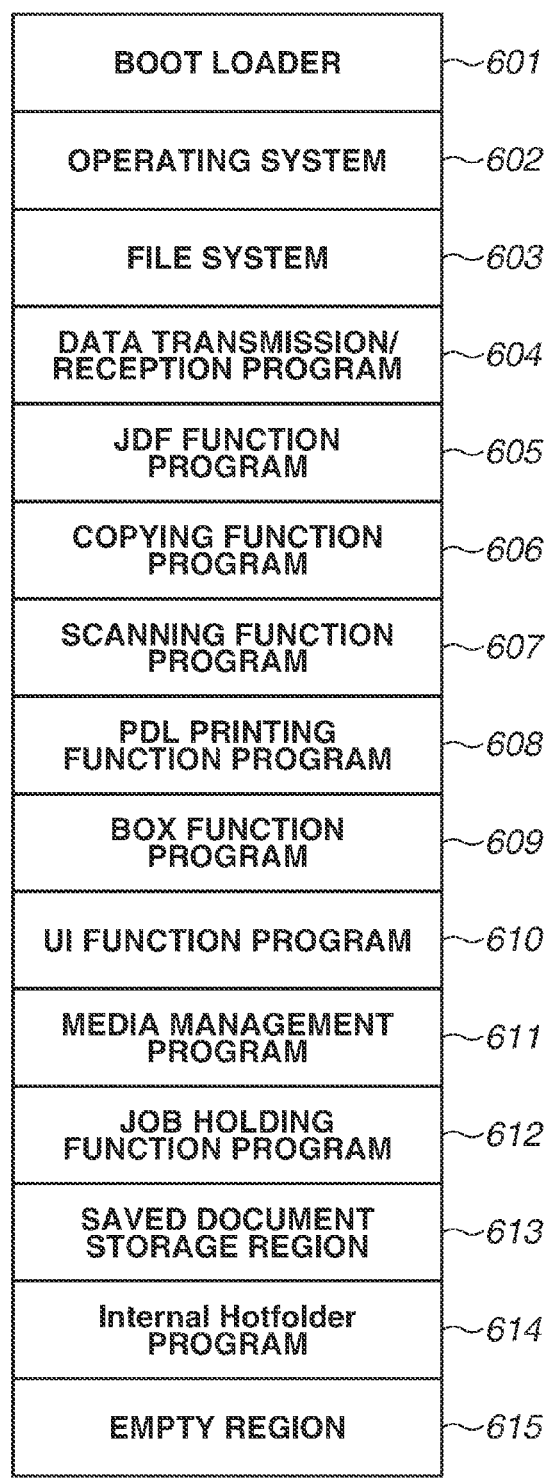
FIG. 6 is a diagram illustrating a software configuration of the multifunction peripheral.

FIG. 6 is a diagram illustrating programs of the MFP 200 according to the present exemplary embodiment. These programs are stored in the ROM 207 to be read and executed by the controller unit 205 of the MFP 200.

A boot loader 601 is a program that is executed immediately after power activation of the MFP 200. This program includes a program for executing various kinds of activation sequence necessary for system activation. An operating system 602 is a program designed to provide an execution environment of various programs that realizes the functions of the MFP 200. The operating system 602 mainly provides a function for managing the resources or the memories of the MFP 200 such as the ROM 207, the RAM 208, and the HDD 209, and a function for controlling basic input and output processes in respective units illustrated in FIG. 2.

A file system 603 is a program that realizes various file management functions such as management of various files stored in the HDD 209, transmission and reception of various files to/from the external apparatus, and sharing of various files with the external apparatus. The file system 603 is accessed from the file system provided by the external apparatus connected to the network 100 via the network I/F 202 to make various operations such as transmission, reception, and copying of the file executable. The file system 603 is a program that enables the external apparatus to create, copy, transmit, or receive a file for the file system of the MFP 200.

A data transmission/reception program 604 executes transmission/reception processing in a case where an input/output request of data is transmitted thereto via the network I/F 202. Specifically, the data transmission/reception program 604 includes a protocol stack such as the Transmission Control Protocol/Internet Protocol (TCP/IP), and controls the communication of various data exchanged with the external apparatus connected thereto via the network 100. The communication processing executed thereby specializes in the communication processing of transmission/reception of data packets or communication processing with respect to the Hyper-Text Transfer Protocol (HTTP) server, and does not include below-described analysis processing related to the content of received data. The analysis processing of data is executed by the controller unit 205 based on the content described in another program.

A job definition format (JDF) function program 605 is a program for causing the controller unit 205 to execute a JDF printing function according to an instruction from the network I/F 202 in a case where the MFP 200 receives JDF job data via the network I/F 202. The controller unit 205 executes the JDF printing function to sequentially instruct each device to execute operations in an appropriate order based on the processing sequence and the processing condition described in the JDF function program 605 so that the JDF print processing is eventually executed. The sheet processing apparatus 250, the printer unit 203, the HDD 209, the compression/rasterization unit 210, and the RAM 208 are included in these devices. Further, the JDF function program 605 also includes a program for causing the controller unit 205 to execute analysis processing of JDF job data received via the network I/F 202, processing for determining whether an incorrect setting is included in the JDF job data based on a result of the analysis processing, and setting change processing for cancelling the incorrect setting.

A copying function program 606 is a program for causing the controller unit 205 to execute a copying function according to an instruction input to the operation unit 204 in a case where a user of the MFP 200 inputs the instruction for executing the copy function to the operation unit 204. The controller unit 205 executes the copying function to sequentially instruct each device to execute the operations in an appropriate order based on the processing sequence and the processing condition described in the copying function program 606 so that the copying processing is eventually executed. The scanner unit 201, the printer unit 203, the sheet processing apparatus 250, the HDD 209, the compression/rasterization unit 210, and the RAM 208 are included in these devices.

A scanning function program 607 is a program for causing the controller unit 205 to execute a scanning function according to an instruction input to the operation unit 204 in a case where the user of the MFP 200 inputs the instruction for executing the scanning function to the operation unit 204. The controller unit 205 controls the modules such as the scanner unit 201, the HDD 209, the compression/rasterization unit 210, and the RAM 208 according to the processing sequence and the processing condition described in the scanning function program 607. At this time, the controller unit 205 sequentially instructs these devices to execute the operations in an appropriate order, so that the scanning processing is executed eventually.

A PDL printing function program 608 is a program for causing the controller unit 205 to execute a PDL printing function in a case where PDL data (i.e., print job data) is received by the MFP 200 via the network I/F 202. The controller unit 205 executes the PDL printing function to sequentially instruct each device to execute the operations in an appropriate order based on the processing sequence and the processing condition described in the PDL printing function program 608 so that the PDL print processing is eventually executed. The sheet processing apparatus 250, the printer unit 203, the HDD 209, the compression/rasterization unit 210, and the RAM 208 are included in these devices.

A BOX function program 609 is a program for causing the controller unit 205 to execute a BOX function according to an instruction input to the operation unit 204 in a case where the user of the MFP 200 inputs the instruction for executing the BOX function to the operation unit 204. The controller unit 205 executes the BOX function to sequentially instruct each device to execute the operations in an appropriate order based on the processing sequence and the processing condition described in the BOX function program 609, so that BOX processing is executed. The scanner unit 201, the printer unit 203, the sheet processing apparatus 250, the HDD 209, the compression/rasterization unit 210, and the RAM 208 are included in these devices. Further, the controller unit 205 can execute job data stored in the HDD 209 by changing a current setting thereof through the BOX function.

A UI function program 610 is a program for controlling the operation unit 204. The UI function program 610 identifies information input through the operation unit 204 by the user of the MFP 200 to shift a screen to an appropriate screen or transmit a processing request to the controller unit 205.

A media management program 611 is a program for executing a management function relating to sheets usable by the MFP 200. The sheet-related information managed by the UI function program 610 is stored in the HDD 209.

A job holding function program 612 is a program executed by the controller unit 205 in a case where the user of the MFP 200 inputs an instruction for executing a job holding function to the operation unit 204. The job holding function is a function for storing printing target data in the HDD 209 of the MFP 200 until the user inputs a printing instruction, and printing that data according to the printing instruction input by the user. The controller unit 205 executes the job holding function to sequentially instruct each device to execute the operations in an appropriate order based on the processing sequence and the processing condition described in the job holding function program 612, so that the print processing is executed through the job holding function. The printer unit 203, the sheet processing apparatus 250, the HDD 209, the compression/rasterization unit 210, and the RAM 208 are included in these devices. The controller unit 205 can execute stored job data by changing a setting currently set to that job data.

In addition, the MFP 200 does not have to include all of the function programs illustrated in FIG. 6, and may include only a part of the above-described function programs or a function program other than the above-described function programs.

A saved document storage region 613 serves as a storage region of saved job data managed by the job holding function program 612. The job data received from the client apparatuses 101 to 103 or other external apparatuses is a saving target and stored in the saved document storage region 613 together with the print setting.

An Internal Hotfolder program 614 is a unique program included in the MFP 200 according to the present exemplary embodiment. The Internal Hotfolder program 614 detects that the file system 603 has stored a file provided from the client apparatus 101, 102, or 103 connected to the network 100. Then, in a case where the detected file is a file of a format printable by the MFP 200, the Internal Hotfolder program 614 executes the print job based on the previously specified printing condition. The Internal Hotfolder program 614 enables the MFP 200 to replace a file transmission operation executed by the external apparatus, with a printing operation. In other words, although a program for executing print processing has to be provided on the client apparatus in the conventional technique, the program for executing print processing does not have to be provided on the client apparatus in the present exemplary embodiment. This is because the file can be transmitted to the file system of the MFP 200 if the client apparatus merely includes a file system. Then, this file transmission operation is processed as the printing operation by the Internal Hotfolder program 614. The file system having a sharing function is normally provided on the recent operating system or the application execution environment thereof. The processing executed through the Internal Hotfolder program 614 will be described below in detail.

An empty region 615 refers to a region within the HDD 209 which does not belong to any of the various programs or various regions described above.

Figure 7:
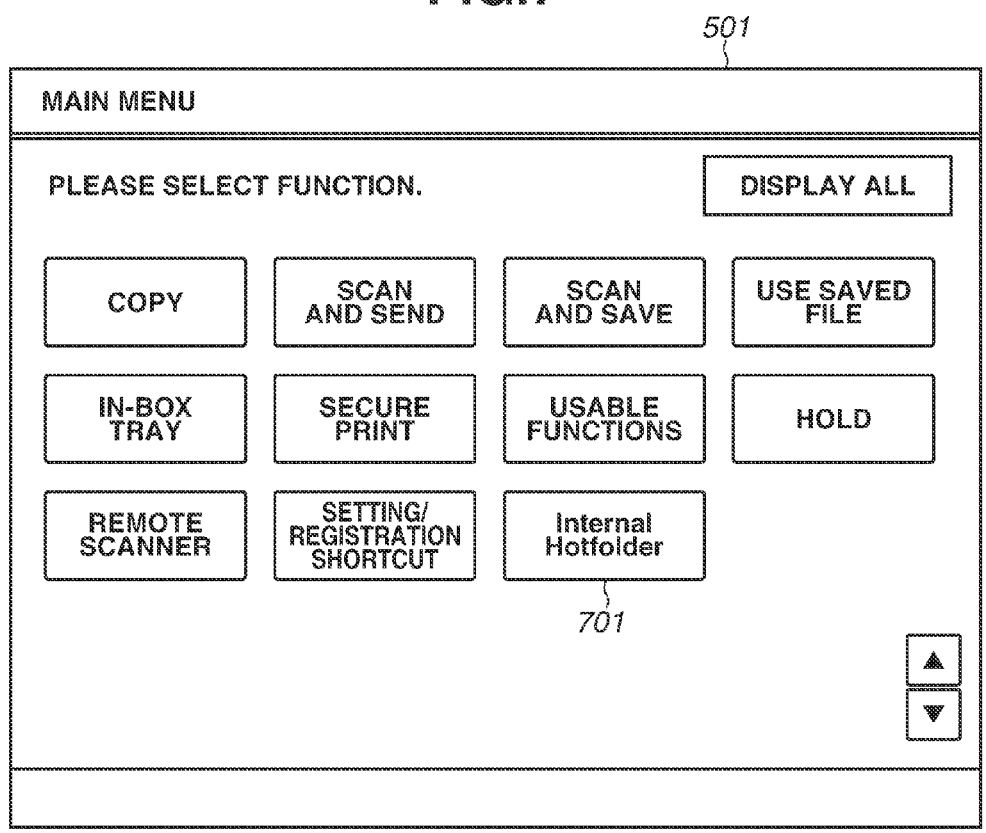
FIG. 7 is a diagram illustrating an example of a function selection screen of the multifunction peripheral displayed on the operation unit.

FIG. 7 is a diagram illustrating an example of a selection screen of various function programs illustrated in FIG. 6 which are displayed on the operation unit 204 by the controller unit 205. A setting button 701 of the Internal Hotfolder program 614 is also arranged on the selection screen in FIG. 7.

Figure 8:
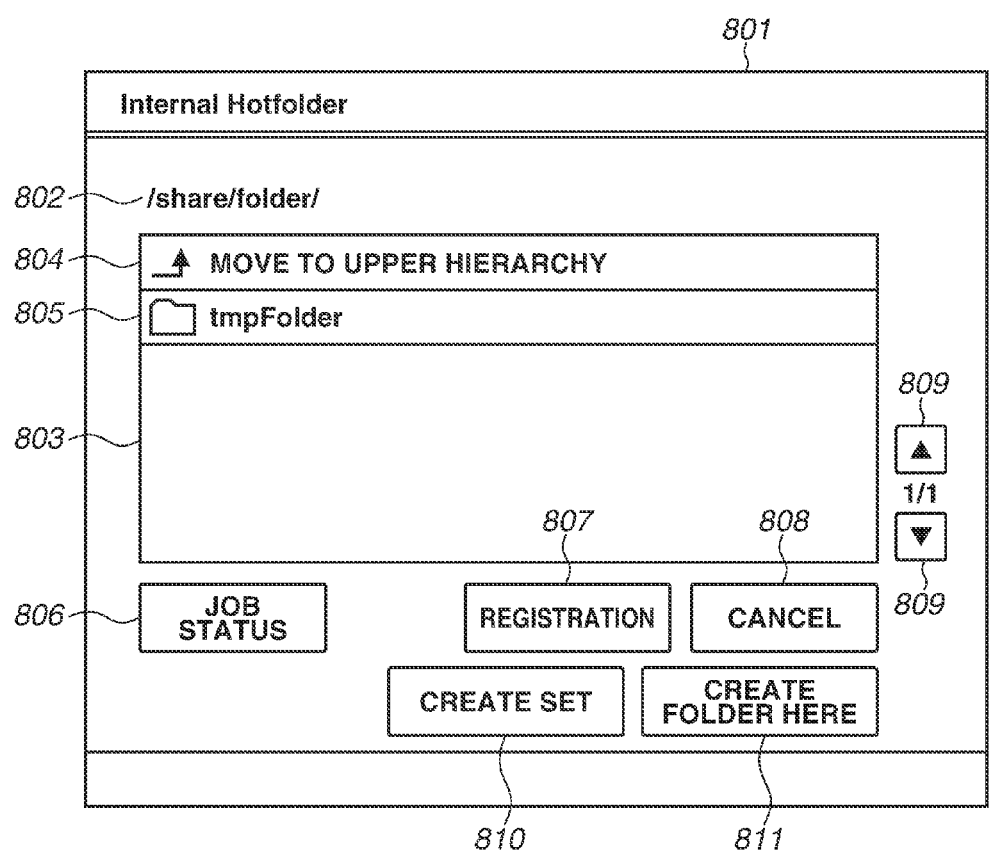
FIG. 8 is a diagram illustrating an example of a setting screen displayed on the operation unit.

FIG. 8 is a diagram illustrating an example of a setting screen 801 of the Internal Hotfolder program 614. The screen in FIG. 8 is displayed immediately after the user touches and operates the setting button 701 of the Internal Hotfolder program 614 in the selection screen in FIG. 7. Hereinafter, constituent elements of the setting screen in FIG. 8 will be described individually.

A file hierarchy display region 802 shows information of a hierarchy in the file system of the MFP 200 which is currently an operation target. The client apparatus such as the PCs 101, 102, or the mobile terminal 103 connected thereto via the network 100 accesses the file system of the MFP 200 based on the above-described hierarchy information. Further, a hierarchy of the folder as a setting or operation target is illustrated in the setting screen in FIG. 8. In the example illustrated in FIG. 8, a hierarchy, "/share/folder/", is selected as the operation target.

A file list 803 shows an entry on the file system placed on the hierarchy which is indicated in the file hierarchy display region 802. In other words, the entry on the file system arranged on the hierarchy "/share/folder/" is displayed thereon. The entry on the file system is either a folder or a file. In the example illustrated in FIG. 8, a folder 805, "tempFolder", is arranged thereon. In addition, a region 804 that displays "MOVE TO UPPER HIERARCHY" functions as a button that is operated when the user moves the hierarchy from the hierarchy "/share/folder" to an upper hierarchy "/share". If the region 804 is touched in a state illustrated in FIG. 8, control is performed such that "/share" is displayed on the file hierarchy display region 802. In other words, an operation target folder hierarchy is moved up by one.

Similarly, a region 805 that indicates "tempFolder" also functions as a button, and a hierarchy, "/share/folder/tempFolder", is specified as an operation target hierarchy when the region 805 is touched. After the region 805 is touched, the information displayed on the file hierarchy display region 802 is "/share/folder/tempFolder". In other words, an operation target folder hierarchy is moved down by one.

As described above, the file list 803 in FIG. 8 provides a function for moving the hierarchy up and down. In a case where an entry on the file system is not a folder, that is, a file is placed on the file list 803 illustrated in FIG. 8, the hierarchy will not be moved even if the user touches a region corresponding to that file. Further, in a case where a part of the entries cannot be displayed on the file list 803 in FIG. 8 because a number of entries on the file system arranged on the hierarchy "/share/folder" is large, the user touches and operates a scroll button 809. With this operation, the screen can be switched and the entries that cannot be displayed on the display region can be displayed.

A job status button 806 is a button for shifting a screen to a status-check screen of the print job executed through the Internal Hotfolder program 614.

A registration button 807 is a button for registering a folder on the hierarchy which is currently the operation target, as a monitoring target folder of the Internal Hotfolder program 614.

A cancel button 808 is a button for eliminating a folder on the hierarchy which is currently an operation target, from a monitoring target folder of the Internal Hotfolder program 614.

The registration button 807 and the cancel button 808 enable or disable the button operations to prevent a meaningless operation such as dual registration of a folder that has been already registered or cancellation of a folder that has not been registered. In the example illustrated in FIG. 8, the hierarchy "/share/folder" is not specified as a monitoring target of the Internal Hotfolder program 614. Accordingly, while the registration button 807 is enabled, the cancel button 808 is disabled.

A button 811, "CREATE FOLDER HERE", which is formed here is a button for creating a new folder that is to be used as a hot folder on a hierarchy which is currently the operation target. A button 810, "CREATE SET", is a button for collectively creating a plurality of preset folders on a hierarchy which is currently the operation target. When the user touches and operates the button 810, a plurality of hot folders is created while a printing specification file defining a preset printing condition is arranged for each hot folder. Then, these folders are registered as the monitoring target folders of the Internal Hotfolder program 614. When the MFP 200 undergoes installation, the above-described function enables the user to collectively create a plurality of folders in association with the printing specification file which describes the frequently-used printing condition, so that convenience of the user is improved. A number of preset folders or printing specification files that is to be associated with the folders can be optionally set.

Figure 9:
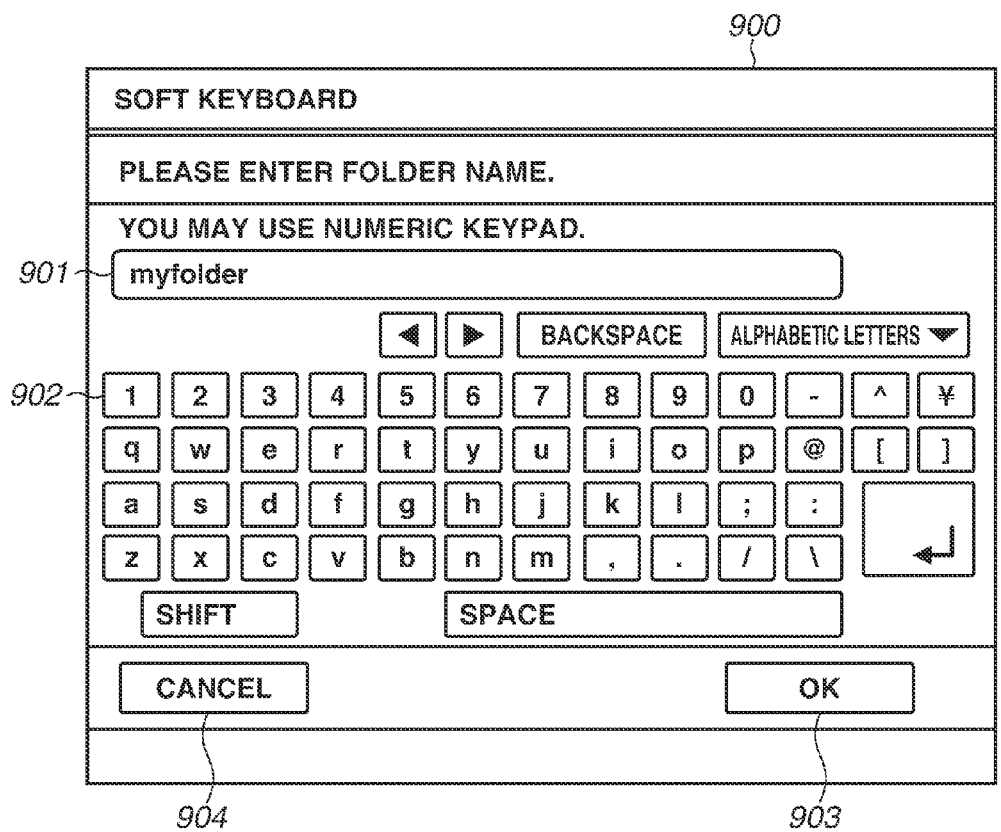
FIG. 9 is a diagram illustrating an example of a screen for creating a hot folder.

FIG. 9 is a diagram illustrating an example of a screen that is to be displayed immediately after the user has touched and operated the CREATE FOLDER HERE button 811 on the screen illustrated in FIG. 8. FIG. 9 is a diagram illustrating a soft keyboard for inputting a name of a folder that is newly created. In other words, the user inputs a name of a folder as a creation target to a folder name input region 901 by using a soft key 902. A folder having the input name is created when the user touches and operates an OK button 903, whereas the screen is shifted to the screen in FIG. 8 without creating any folder when the user touches and operates a cancel button 904. In a case where the user touches and operates the OK button 903 after shifting the screen from the screen in FIG. 8 to the screen in FIG. 9, a folder, "/share/folder/myfolder", is created.

Figure 10:
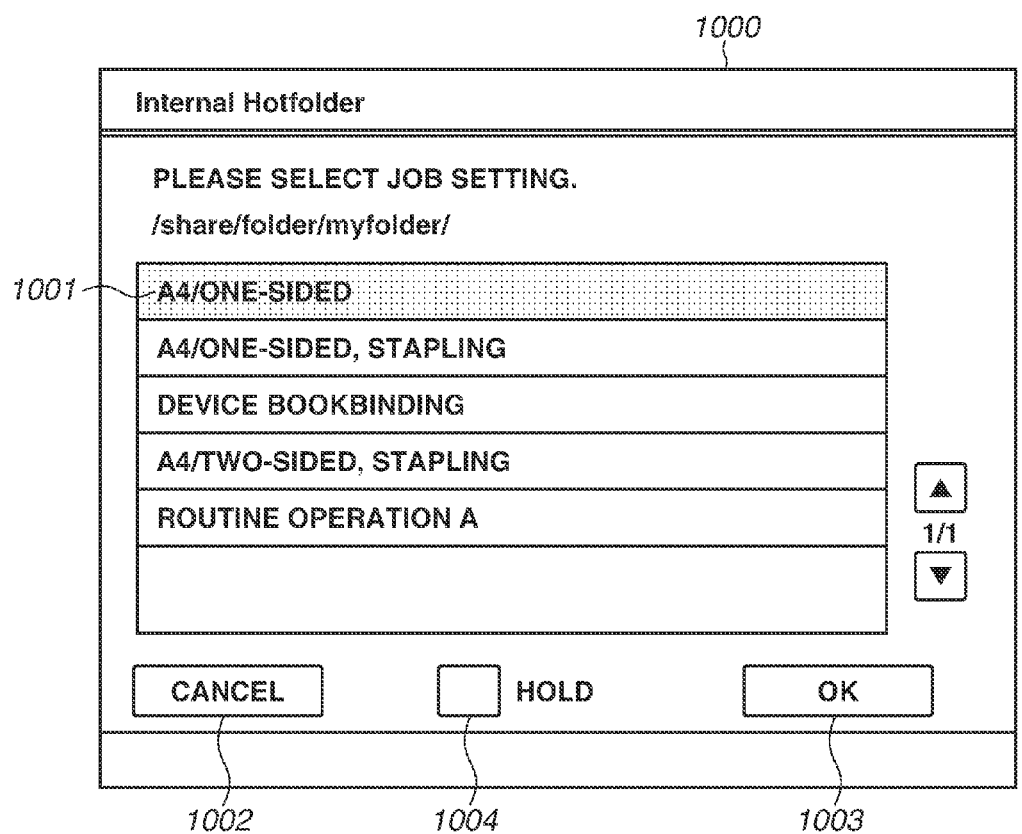
FIG. 10 is a diagram illustrating an example of a screen for selecting a printing condition.

FIG. 10 is a diagram illustrating an example of a selection screen for setting a printing condition onto the created folder, which is displayed immediately after the OK button 903 is touched and operated on the screen illustrated in FIG. 9.

As illustrated in FIG. 10, a list of a plurality of items having printing specification names is displayed on a region 1001. Each of the items on the list functions as a button. Control is performed such that the user can select a printing specification by touching and operating the item. In the example illustrated in FIG. 10, "A4/ONE-SIDED" is selected as the printing specification.

Further, in a case where the REGISTRATION button 807 is touched and operated on the screen illustrated in FIG. 8, a folder selected in that screen is registered as a monitoring target of the internal Hotfolder program 614. Accordingly, when the REGISTRATION button 807 is touched, the soft keyboard screen for creating a folder illustrated in FIG. 9 is skipped such that the screen is directly shifted to the printing specification setting screen illustrated in FIG. 10.

In a case where a CANCEL button 1002 is touched and operated on the screen illustrated in FIG. 10, setting processing will be ended without setting the printing specification onto the created folder. In other words, in such a case, the folder created or selected in FIG. 9 or 8 will not be set as a monitoring target of the Internal Hotfolder program 614. On the other hand, in a case where an OK button 1003 is touched and operated, the folder created or selected in FIG. 9 or 8 is associated with the printing specification selected in FIG. 10 and set as the monitoring target of the Internal Hotfolder program 614. In other words, the folder "/share/ folder/myfolder" is registered as the Internal Hotfolder, and the printing specification "A4/ONE-SIDED" is associated therewith. Therefore, the client apparatus such as the PCs 101, 102, or the mobile terminal 103 copies or transfers a file as a printing target to the folder "/share/folder/myfolder" set public by the MFP 200. Transfer processing of the above file is executed through the file system 403 operating on the operating system 402 of the client apparatus. In other words, a program that is operated when a file is copied from the client apparatus to the MFP 200 is a versatile program operating on the client apparatus, and the program is not a special program for causing the MFP 200 to print a desired file. Only because a printing target file can be transferred to the MFP 200 through the file system 403 which is a versatile program provided by each of the operating systems, the above-described method has a beneficial effect on the print processing executed by the MFP 200. Thus, a purpose of providing the Internal Hotfolder program 614 can be achieved as described above.

When the printing target file has been transferred or copied to the Internal Hotfolder, the user may select a HOLD button 1004 in FIG. 10 to make the MFP 200 execute processing for storing the printing target file in the saved document storage region 613 instead of executing the print processing. A holding function refers to a function of the job holding function program 612 described in FIG. 6. In addition, depending on whether the MFP 200 holds a job, there arises variation in behavior, for example, a printed sheet product is output or the sheet is not output although the processing is executed up to rasterization. However, in the below-described example, even in a case where the holding function is specified, it is assumed to be included in the print processing in a broad sense.

Figure 11:
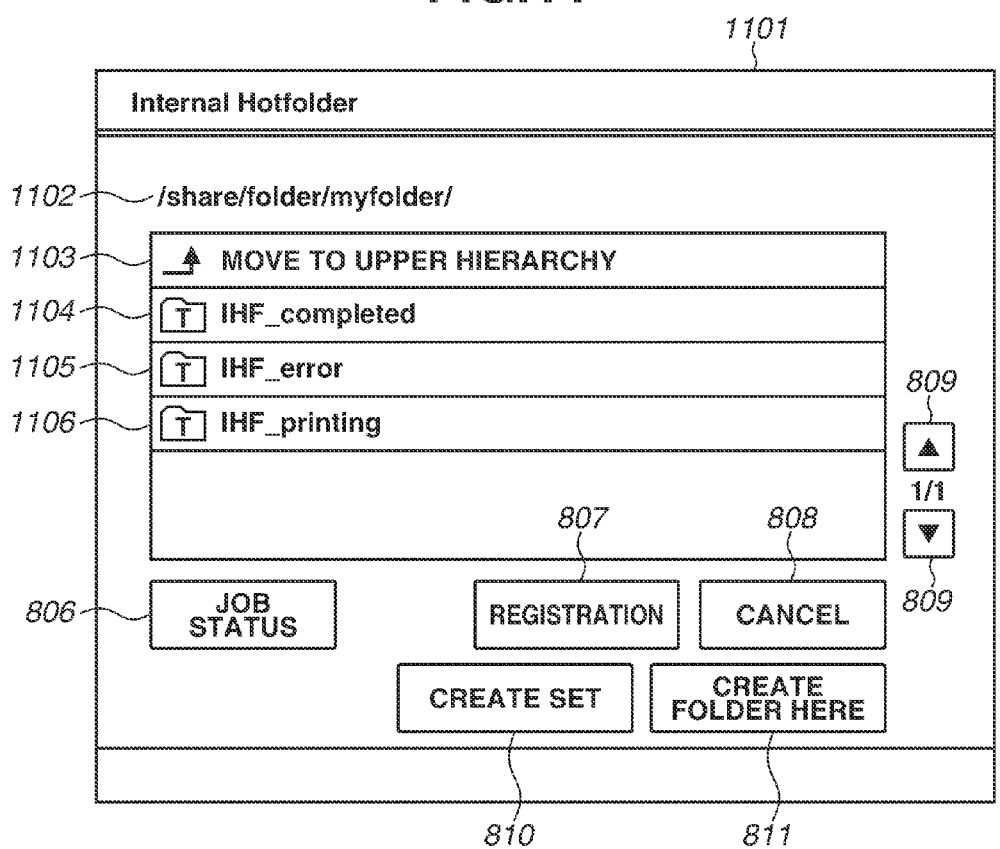
FIG. 11 is a diagram illustrating an example of a screen that is to be displayed after the hot folder has been created.

FIG. 11 is a diagram illustrating an example of a screen that is to be displayed immediately after the OK button 1003 is touched on the screen illustrated in FIG. 10. As illustrated in FIG. 11, at a position below the folder, "/share/folder/myfolder", created on the screen in FIG. 9, three sub-folders are created automatically. The three folders are "IHF_completed" (printing completed folder 1104), "IHF_error" (error folder 1105), and "IHF_printing" (printing folder 1106).

The sub-folders 1104 to 1106 are automatically created by the Internal Hotfolder program 614 when the Internal Hotfolder is successfully registered. The sub-folders 1104 to 1106 are controlled and managed by the file system 603 as normal folders. However, the Internal Hotfolder program 614 identifies and uses these folders as special folders. In other words, a copied or transferred printing target file is moved to any of these sub-folders arranged at a position below the Internal Hotfolder in the course of print processing executed by the Internal Hotfolder program 614. A name of each sub-folder represents a processing status of the printing target file processed by the Internal Hotfolder program 614 of the MFP 200 at that time. In other words, the client apparatus such as the PCs 101, 102, or the mobile terminal 103 can check the printing status of the file as a printing target by monitoring the content of these sub-folders.

Therefore, even in the above operation only a function of the versatile program is used, that is, the entry of the folder set public by the MFP 200 is checked through the file system 403 of the client apparatus. Even so, a monitoring function of a print job status that has required a program specific to each client apparatus in the conventional technique can be realized with only a function of the versatile program.

Figure 12:
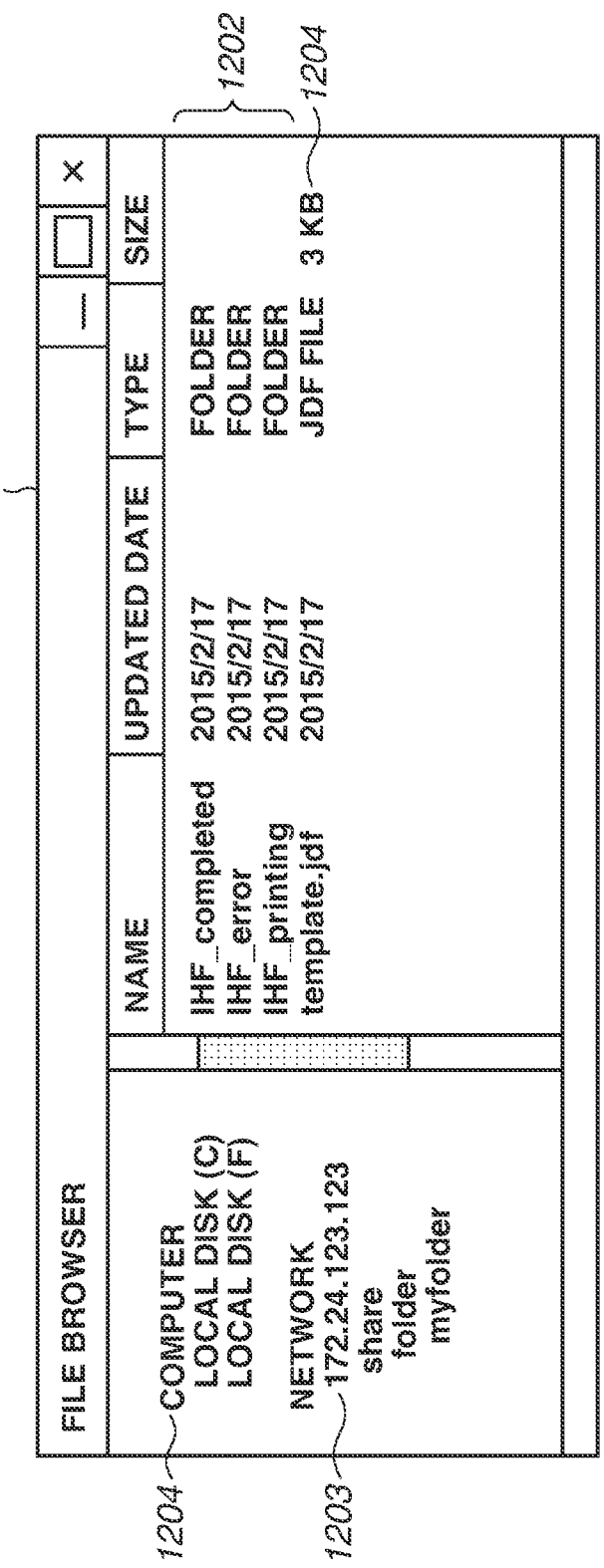
FIG. 12 is a diagram illustrating an example of information within the hot folder that is to be displayed through a file browser of the client apparatus.

FIG. 12 is a diagram illustrating an example of a screen of a file browser that is a part of the function of the file system 403 included in the client apparatus such as the PCs 101, 102, or the mobile terminal 103 as a standard function. In addition to the function for displaying the content of own file system of the client apparatus 101, 102, or 103, the file browser also includes a function for displaying the content of the file systems of other network devices shared via the network 100. The content of the file system is displayed on a region 1204. The content of the file system of the external apparatus connected thereto via the network 100 is displayed on a region 1203. Herein, a network address "172.24.123.123" is set to the MFP 200. In other words, the above example illustrates a state where the Internal Hotfolders illustrated in FIGS. 8 to 11, which are set by the MFP 200 connected to the client apparatus 101, 102, or 103 via the network 100, are displayed by the client apparatus 101, 102, or 103. As illustrated in FIG. 12, folders corresponding to the folders 1104, 1105, and 1106 illustrated in FIG. 11 are displayed in a region 1202. Further, a file 1204 named "template.jdf" exists in the region 1202. This file corresponds to the printing specification file illustrated in FIG. 10 which stores the content of the printing specification associated with the Internal Hotfolder. In the present exemplary embodiment, the printing specification file in which the printing specification is described in a JDF format will be shown as an example. The JDF format is described in a text format.

The file named "template.jdf" is not displayed on the screen illustrated in FIG. 11. On the other hand, this file is displayed on the screen in FIG. 12. This is because the Internal Hotfolder program 614 according to the present exemplary embodiment requests only a function of a versatile file system from the client apparatus. In other words, the screen illustrated in FIG. 11 is a part of the Internal Hotfolder program 614 operating on the MFP 200. Accordingly, it is not always necessary to display a file that is to be associated therewith. Because it is rather possible that the operation may become complicated, the printing specification file is not displayed intentionally. On the other hand, if the user uses a function of the file system to display the content of the Internal Hotfolder in the client apparatus, as illustrated in FIG. 12, the user can check the printing specification file, similar to the folders. Furthermore, the user can edit, delete, and add the content of the printing specification file by using the file browser of the client apparatus. Therefore, once the Internal Hotfolder is created by the optional name in association with an optional printing specification, the user can edit the printing specification file in an optional manner.

When the content of the printing specification file is edited, deleted, or added, the user may use a command or an application such as a text editor provided for use in a versatile manner in the operating system operating on the client apparatus or in the application execution environment thereof.

According to the present exemplary embodiment, the print setting can be also made by a versatile text editing unit operating on a versatile file system and each client apparatus. On the other hand, in the conventional technique, the printing specification has been set or changed by a printer driver or a Hotfolder management application. Accordingly, in the conventional technique, the printing specification has been edited by a non-versatile program provided for each client apparatus. The present exemplary embodiment achieves such an effect that the printing specification can be set or changed by only a versatile method.

FIG. 13 is a diagram illustrating an example of the content of the file "template.jdf" illustrated in FIG. 12 in which the printing specification is defined. When the operation is executed on the screen in FIG. 10, the printing specification "A4/ONE-SIDED" is assigned to a folder "/share/folder/myfolder". The printing specification in the JDF format illustrated in FIG. 13 includes the content of the setting in which a sheet size and a printing face are respectively specified as "A4" and "one sided".

As described with respect to FIG. 12, this file can be changed by an editing program such as a versatile-use text editor operating on the client apparatus. Therefore, it is possible to apply an optional setting to the created Internal Hotfolder in the JDF format.

FIG. 14 is a diagram illustrating an example of a screen that is displayed when a printing target file is copied to a predetermined Internal Hotfolder in the MFP 200 via the file browser in the client apparatus. A file 1401 named "Sample.pdf" in FIG. 14 is a printing target file which the user of the client apparatus instructs the MFP 200 to print by using the method according to the present exemplary embodiment. However, as described above, because the user uses the file copying function or the file transfer function provided by the file system, the user can provide a printing instruction without relying on the non-versatile program specific to the client apparatus. In other words, the user can give a printing instruction by simply executing a drag-and-drop operation or a copy-and-paste operation on the client apparatus.

Figure 15:
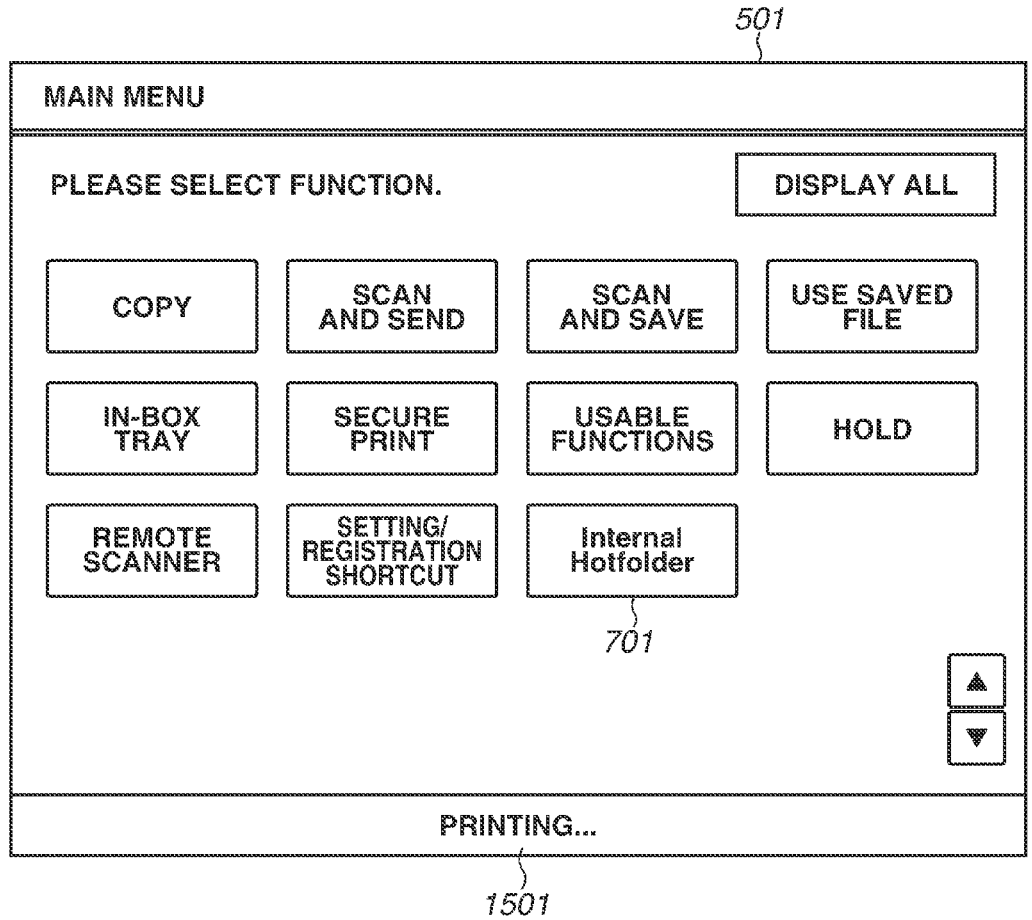
FIG. 15 is a diagram illustrating an example of the operation unit after the operation illustrated in FIG. 14 has been executed by the client apparatus.

FIG. 15 is a diagram illustrating an example of a screen of the operation unit 204 of the MFP 200 which is displayed when the operation illustrated in FIG. 14 has been executed by the client apparatus. A status line is displayed on a region 1501. In other words, an operation status of the MFP 200 is displayed thereon in a simplified manner. In the example illustrated in FIG. 15, in order to notify the user that the print processing is being executed by the MFP 200, a message "PRINTING . . . " is displayed, which indicates that the MFP 200 prints the file, "Sample.pdf", illustrated in FIG. 14 by simply executing file copying processing through the method provided by the Internal Hotfolder program 614 according to the present exemplary embodiment.

Figure 16:
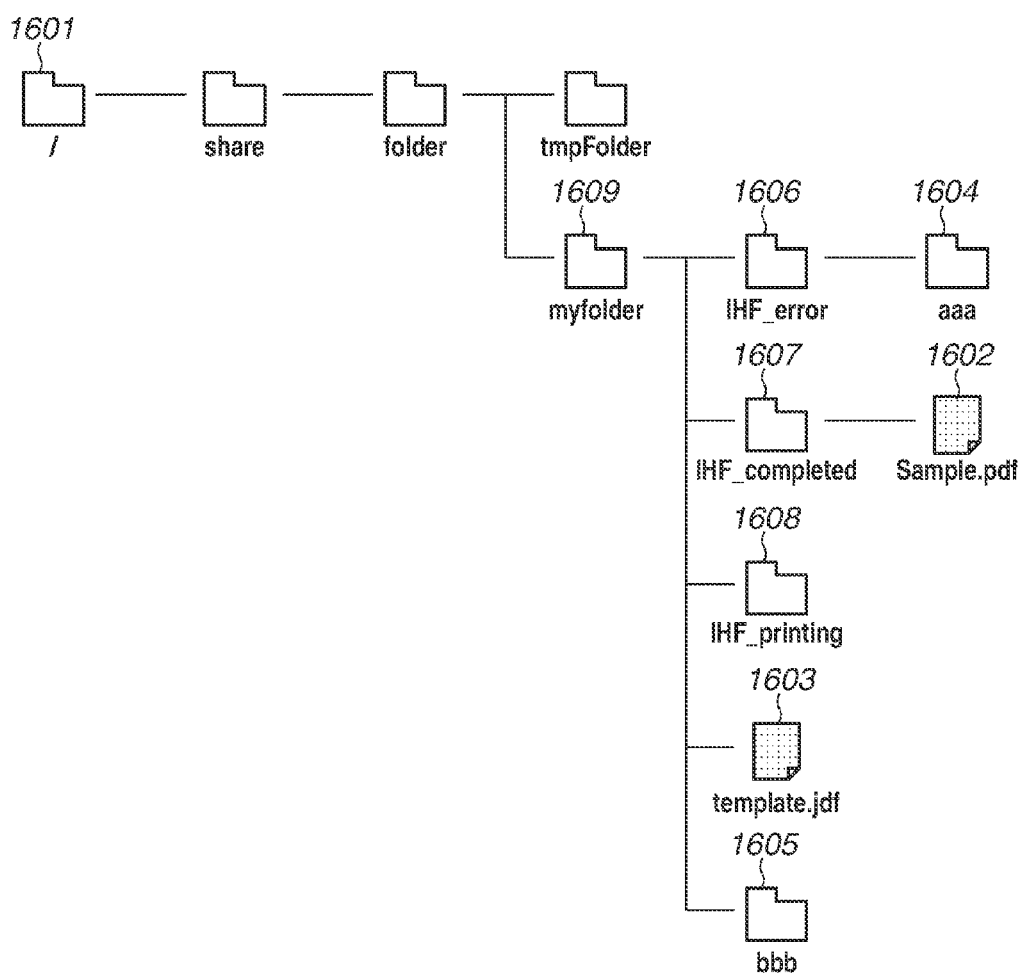
FIG. 16 is a diagram illustrating an example of a hierarchy of a file system.

FIG. 16 is a hierarchy diagram illustrating a hierarchy of the file system in the MFP 200 after a series of operations described above has been executed. An icon 1601 indicates that an entry on the file system arranged on the corresponding hierarchy is a folder. On the other hand, an icon 1603 indicates that an entry on the file system arranged on the corresponding hierarchy is a file.

A folder, "share", is arranged as a lower folder of a root folder in FIG. 16. This folder corresponds to a shared folder. Then, the Internal Hotfolder, "share/folder/myfolder", created through the processing described in FIGS. 8 to 11 can be confirmed (an icon 1609). Further, the folders illustrated in FIG. 11, which are used by the Internal Hotfolder program 614 to check the status of print processing, can be confirmed (icons 1606, 1607, and 1608).

Further, the printing specification file, "template.jdf", that is associated with the Internal Hotfolder in FIG. 8 can be confirmed by an icon 1603. Furthermore, it is possible to confirm that the file 1401, "Sample.pdf", illustrated in the example in FIG. 14 is moved to a position below the folder, "IHF_completed", (printing completed folder 1607) after the print processing is executed according to an instruction to the file 1401. The above moving processing of the folder is executed by the Internal Hotfolder program 614 in the MFP 200 along with the progress of the print processing. In a case where the print processing has eventually succeeded, the file is moved to a position below the folder IHF_completed" (printing completed file 1607). On the other hand, in a case where the print processing has failed for some reason, the file is moved to a position below the folder "IHF_error" (error folder 1606). While the print processing is in the progress, the file is moved to a position below the folder "IHF_printing" (printing folder 1608). When any of these folders is checked through a file browser of the client apparatus provided for a versatile use, a status of the print processing of the print target file can be checked through only the function of the file system.

Further, as described above, the Internal Hotfolder program 614 enables the user to construct a printing system by using only a versatile function of the file system. From a standpoint of the file system, a folder set as the Internal Hotfolder is regarded as a folder in a true sense. In other words, it is not necessary for the client apparatus to execute any program specific thereto. For example, in FIG. 16, a folder, "bbb" (icon 1605), is arranged at a position below the folder, "myfolder" (icon 1607). The user can easily create the above folder by using the file browser as illustrated in FIG. 12. Alternatively, the user can create the folder by executing a folder creation command via a terminal application. Further, for example, in FIG. 16, the user can check a folder, "aaa" (icon 1604), existing in a position below the folder "IHF_error" (error folder 1606). Similarly, the user can easily create this folder by using the file browser.

Although the folders "aaa" and "bbb" (icons 1604 and 1605) are created and positioned below the Internal Hotfolder, the Internal Hotfolder program 614 does not require the existence of these folders. However, from a standpoint of the client apparatus, the Internal Hotfolder, "/share/folder/myfolder", is actually a folder in the versatile file system. Accordingly, the client apparatus cannot make or does not have to make a distinction between the folder treated as the Internal Hotfolder and the folder that is not treated as the Internal Hotfolder. Accordingly, it is possible to take the folder configuration as illustrated in FIG. 16.

FIG. 17 is a flowchart illustrating print processing executed by the MFP 200. The processing illustrated in FIG. 17 is executed when the controller unit 205 comprehensively executes the programs illustrated in FIG. 6.

In step S1701, the controller unit 205 executes detection processing for receiving data from the client apparatus 101, 102, or 103, which starts the processing illustrated in the flowchart of FIG. 17.

In step S1702, the controller unit 205 analyzes the data transmitted from the client apparatus 101, 102 or 103 via the network 100 and determines whether the client apparatus has given an instruct to the MFP 200 to store the file in a shared folder.

In a case where a result of the determination made in step S1702 is true (YES in step S1702), the processing proceeds to step S1703. On the other hand, in a case where a result of the determination made in step S1702 is false (NO in step S1702), the processing proceeds to step S1718 and subsequent steps.

In step S1718, the controller unit 205 determines whether the data received in step S1701 is a PDL print job. In a case where the received data is determined to be the PDL print job (YES in step S1718), the processing proceeds to step S1719. In step S1719, the controller unit 205 executes the received PDL print job. The controller unit 205 executes the PDL printing function program 608 illustrated in FIG. 6 to perform the PDL print job in step S1719. After the processing of the PDL print job is completed in step S1719, the processing flow illustrated in FIG. 17 is ended.

However, in a case where the data received in step S1701 is determined to be the data other than the PDL print job (NO in step S1718), the processing proceeds to step S1720. In step S1720, the controller unit 205 further executes determination processing.

In step S1720, the controller unit 205 determines whether the data received in step S1701 is a JDF print job. In a case where the received data is determined to be the JDF print job (YES in step S1720), the processing proceeds to step S1721. In step S1721, the controller unit 205 executes the received JDF print job. The controller unit 205 executes the JDF function program 605 illustrated in FIG. 6 to perform the JDF print job in step S1721. After the processing of the JDF print job is completed in step S1721, the processing flow illustrated in FIG. 17 is ended.

After the determination in step S1720, in a case where the data received in step S1701 is determined to be the data other than the JDF print job (NO in step S1720), the processing proceeds to step S1722. In step S1722, the controller unit 205 executes predetermined processing which does not belong to any of the processing for copying a file to the folder, the processing for executing the PDL print job, and the processing for executing JDF print job, and ends the processing flow illustrated in FIG. 17. No matter what processing is executed in step S1722, the processing is not important in describing the effect of the present exemplary embodiment, and thus detailed description thereof will be omitted.

In step S1704, the controller unit 205 determines whether a destination of the file copied to the shared folder of the MFP 200 from the client apparatus in step S1703 is the Internal Hotfolder. As to whether a copy destination folder is the Internal Hotfolder or not can be determined depending on whether the MFP 200 has executed registration processing of the folder according to the method described in FIGS. 8 to 11.

As a result of the determination in step S1704, if the copy destination folder is determined to be the Internal Hotfolder (YES in step S1704), the processing proceeds to step S1705 and subsequent steps. On the other hand, in a case where the copy destination folder is determined to be the folder other than the Internal Hotfolder (NO in step S1704), the file is merely copied to a public folder. Accordingly, it is not necessary to execute the processing in step S1705 and subsequent steps specific to the Internal Hotfolder, and thus the processing illustrated in the flowchart is ended.

In step S1705, the controller unit 205 determines whether the printing specification file is placed within the Internal Hotfolder on which the copying processing has been executed in the preceding steps. In the Internal Hotfolder program 614 according to the present exemplary embodiment, as described above with reference to FIGS. 12 to 15, print processing can be achieved based on only a method of the file system without using any specific method. At this time, as illustrated in FIG. 12 as an example, a printing specification that is to be applied to the print processing is also placed within the Internal Hotfolder as a file. In the determination processing In step S1705, if it is determined that the printing specification file is placed within the copy destination Internal Hotfolder as expected (YES in step S1705), a condition for executing the normal print processing is satisfied. Therefore, the processing proceeds to step S1706 and the subsequent steps. On the other hand, in step S1705, if it is determined that the printing specification file is not placed within the copy destination Internal Hotfolder as expected (NO in step 31705), a condition for executing the normal print processing is not satisfied. For example, this may happen when the printing specification file is deleted via the file browser of the client apparatus. In such a case, the processing proceeds to step S1717. In step S1717, the controller unit 205 copies the file copied to the Internal Hotfolder to the IHF_error folder (error folder). Then, the controller unit 205 ends the job as an error and ends the print processing executed by the Internal Hotfolder program 614.

In step S1706, the controller unit 205 determines whether the file copied to the Internal Hotfolder is a file of a format printable and directly supportable by the MFP 200.

After the determination in step S1706, in a case where the file is determined to be the print data of a format printable and directly supported by the MFP 200 (YES in step S1706), the processing proceeds to step S1709. On the other hand, after the determination in step S1706, if the file is determined to be the print data of a format printable but not directly supported by the MFP 200 (NO in step S1706), the processing proceeds to step S1707.

An example of the print data of a format printable but not directly supported by the MFP 200 will be described below. For example, data of a format specific to applications of word processors or spreadsheets operating on the client apparatus is the above-described data. These applications are in widespread use and versions or variations thereof have become diversified. Further, many of these applications are provided in the formats (predetermined formats) uniquely determined by the application vendors. Accordingly, in a case where print processing of data in such a format is executed, in general, the application is activated on the client apparatus to use a function of a printer driver provided by that application. Obviously, providing a configuration that enables the MFP 200 to print data of a format specific to the application of a word processor or a spreadsheet is extremely difficult if not impossible because the above-described applications exist in large numbers. Accordingly, it is difficult to print data in such a format through the method of the Internal Hotfolder. Therefore, by using the conversion server 106 illustrated in FIG. 1, even if the MFP 200 does not directly support the above-described data in the application-specific format, can execute the print processing by making a system having a conversion function serve as the conversion unit. The MFP 200 leaves only the conversion unit to the system having a conversion function. The above-described data format conversion server may be provided by the application vendor of data as a conversion target, or may be provided by another vendor. A service for converting data of a format specific to the application vendor, known as "cloud conversion service", is becoming widespread. Accordingly, if the function of the cloud conversion service can be utilized in the printing system, it is possible for the MFP 200 to print data of a format that is not directly supported thereby. In other words, print processing can be executed if the flowchart of the print processing using the Internal Hotfolder includes determination processing executed in step S1706, data transmission processing and data conversion request processing with respect to the cloud conversion server executed in step S1707, and acquisition processing of the converted file in step S1708. Because the file is converted into a file in a predetermined format directly supported by the MFP 200, the processing subsequent to the processing in step S1708 is the same as the processing that is to be executed when a determination result is "true" in step S1706.

In addition, in a case where the file stored in the Internal Hotfolder is a file that is not printable either by the MFP 200 (NO in step S1706) or the conversion server 106, the processing may proceed to step S1717.

In step S1709, the printing target file (including the converted file acquired from the conversion server 106) and the printing specification file are combined. For example, the printing specification file is provided in the JDF file format as illustrated in FIG. 13. The printing specification file and the printing target file are combined, so that the MFP 200 can internally execute the file as a print job. In other words, the Internal Hotfolder program 614 internally generates a print job by using a JDF file associated with the Internal Hotfolder as a printing specification and the file copied to the Internal Hotfolder as a printing target file.

In step S1710, processing of the print job data created in step S1709 is started. The processing in step S1710 corresponds to the processing in which the data created in step S1709 is executed by the JDF function program 605 illustrated in FIG. 6.

Next, the Internal Hotfolder program 614 determines whether printing is executable by the MFP 200. Based on the determination that the printing is executable, in step S1711, the printing target file is moved to a position below the folder "IHF_printing" (printing folder 1106) from a position just below the Internal Hotfolder.

In other words, if the operator checks the printing target file via the file browser (in FIG. 12) of the client apparatus after the processing is executed in step S1711, it is found that the printing target file is moved to a position below the folder "IHF_printing" (printing folder 1106) from a position just below the Internal Hotfolder. With this configuration, the operator can confirm through a versatile function of the file system that the print processing is started with respect to the file stored in the Internal Hotfolder.

The processing in steps S1712 to S1714 is actual print processing internally executed by the JDF function program 605 of the MFP 200. The Internal Hotfolder program 614 simply waits until the JDF function program 605 ends the print processing because actual data processing and job execution processing are executed by the JDF function program 605.

In step S1715, the controller unit 205 executes determination processing with respect to a processing result acquired in steps S1712 to S1714 which is processed by the JDF function program 605. If it is determined that a print product has been correctly output through the JDF function program 605 (YES in step S1715), the processing proceeds to step S1716. On the other hand, if it is determined that a print product has not been correctly output through the JDF function program 605 and printing has failed (NO in step S1715), the processing proceeds to step S1717.

The processing in step S1716 is executed through a file browser operating on the client apparatus in a case where the print processing of the printing target file arranged on the Internal Hotfolder of the MFP 200 is correctly executed. As the printing target file is correctly output, the printing target file is moved to a position below the folder "IHF_completed" (printing completed folder 1104).

The processing in step S1717 is executed through a file browser operating on the client apparatus in a case where the print processing of the printing target file arranged on the Internal Hotfolder of the MFP 200 is not correctly executed. Because the printing target file is not output correctly and thus printing thereof has failed, the printing target file is moved to a position below the folder, "IHF_error", (error folder 1105).

The operator can check the printing status of the printing target file by checking the status folder to which the printing target file has been moved, via the file browser of the client apparatus. At this time, the file browser provided for the versatile use is used. Accordingly, a restriction due to the operating system operating on the client apparatus does not have to be imposed on the operation for checking the printing status, and thus the operator can check the status by using only the versatile method.

After the file has moved to the corresponding folder in step S1715 or S1716, the print processing by the Internal Hotfolder program 614 illustrated in the flowchart is ended.

Hereinafter, a second exemplary embodiment will be described. According to the flowchart illustrated in FIG. 17, print processing of the next file will not be started until the output processing of the printing target file placed within the Internal Hotfolder is ended. However, it is possible to provide a configuration in which the monitoring processing of the printing target file and the actual print processing by the JDF function program 605 are processed in parallel. In order to provide the above-described configuration, the present exemplary embodiment includes a method for managing the maximum number of jobs that are internally generated in the MFP 200 through the internal job generation processing in steps S1708 and S1709. Specifically, in a case where the number of internally-generated jobs has reached a threshold value, job generation processing of the subsequent file is suppressed. The job generation processing thereof is restarted when the preceding output processing is completed. The above method is provided because a queue of print jobs internally storable in the MFP 200 has limitation in numbers. In other words, for example, the printing target files in huge numbers of several millions may be collectively selected and copied to the Internal Hotfolder on a client apparatus side. As it is not assumed to store the queue of print jobs in such huge numbers in the MFP 200, there is a risk that the queue may overflow. In order to prevent the above-described problem from occurring, the Internal Hotfolder program 614 according to the present exemplary embodiment includes the above-described method for controlling the processing flow based on the maximum number.

As illustrated in FIG. 12, in the first exemplary embodiment, the printing specification file (icon 1204) is placed on the file system as one of the files. In a third exemplary embodiment, the printing specification file associated with the folder is concealed by the Internal Hotfolder program 614 instead of being arranged on the file system. The association information itself is managed by the Internal Hotfolder program 614 along with the operation illustrated in FIGS. 8 to 11. However, the present exemplary embodiment is different in that the printing specification file is managed by the Internal Hotfolder program 614 itself instead of being arranged on the file system.

The above-described exemplary embodiment is employed to prevent the below-described problem. In a case where the printing specification file is arranged on a shared folder of the file system, the printing specification file may be deleted or moved to another folder by a user of the client apparatus accessible to that shared folder. If the printing specification file is deleted or moved as described above, there is a risk that the print processing cannot be executed because the actual printing specification file does not exist even though the association information exists therein.

According to the present exemplary embodiment in which the printing specification file is not directly arranged on the file system, it is possible to prevent the above-described problem from occurring. However, in a case where the above-described configuration is employed, the convenience in the first exemplary embodiment will be lost in which the user can change the printing specification through a program such as a text editor for the versatile use.

A fourth exemplary embodiment combines the third exemplary embodiment with the first or the second exemplary embodiment. In other words, for each of the Internal Hotfolders, at the time of registration, the user can select whether to directly arrange the printing specification file on the file system or to make the Internal Hotfolder program 614 internally execute association management. With this configuration, a user is allowed to edit the printing specification file while the printing specification file is prevented from being operated with respect to a folder that may possibly be operated by mistake. By giving a choice of operation types to the user who executes system settings, although there is a risk of erroneous operations, it is possible to provide convenience of the editable function to the user.

In addition, the file system may also provide a function of enabling the user to set an access right for each folder. If such a function is usable, convenience of the user can be further improved. For example, in a case where the user creates a folder, "public", and allows a mobile terminal 103 brought from the outside of the network 100 to print the print data literally as a public folder, the printing specification is associated therewith as an internal operation. On the other hand, the user may create a folder, "private", and allow only a known client apparatus directly connected to the network 100, to access the "private" folder while the printing specification is set thereto by arranging a printing specification file. The present exemplary embodiment enables the user to execute both of the above-described operations based on the setting of access rights of the folders included in the file system. Even in the above-described configuration, the client apparatus does not have to employ a specific program to execute the above-described operations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-046433, filed Mar. 9, 2015, which is hereby incorporated by reference herein in its entirety.

What is claimed is:

1. An image forming apparatus using an image forming unit configured to form an image on a sheet, the image forming apparatus comprising:
    a storage unit configured to store data, a plurality of folders being stored in the storage unit, the plurlaity of folders including a first folder and a second folder, the plurality of folders being accessible from an external apparatus, specific print setting being associated with the first folder, no print setting being associated with the second folder; and
    a controller having a processor executing instructions stored in a memory or having circuitry;
    wherein the controller obtains a first file requested to be stored into the first folder, and causes the image forming unit to perform print processing based on the first file by using the specific print setting; and
    wherein the controller obtains a second file requested to be stored into the second folder, and stores the second file into the second folder without causing the image forming unit to perform print processing based on the second file.

2. The image forming apparatus according to claim 1, wherein the controller is configured to perform a process of accepting change of the print setting associated with the specific folder.

3. The image forming apparatus according to claim 1, wherein the specific folder is a shared folder.

4. The image forming apparatus according to claim 3, wherein the shared folder is accessed from a plurality of external apparatuses by using a file-sharing protocol.

5. The image forming apparatus according to claim 4, wherein the file-sharing protocol is a Server Message Block (SMB) protocol or a Web-based Distributed Authoring and Versioning (WebDAV) protocol.

6. The image forming apparatus according to claim 1, wherein the controller is configured to perform a process of setting, as an address of the file obtained from the external apparatus, a first address within the specific folder and perform a process of changing the address of the file to a second address different form the first address after the image formation based on the file is performed.

7. The image forming apparatus according to claim 1, wherein the controller is configured to perform a process of determining that the filed obtained from the external apparatus is in a format enabling the image forming unit to perform the image formation and setting, as the address of the file, the first address within the specific folder, and perform a process of determining that the file obtained from the external apparatus is a format not enabling the image forming unit to perform the image formation and changing the address of the file to the second address different form the first address.

8. The image forming apparatus according to claim 1, wherein the controller is configured to perform a process of determining that the file obtained from the external apparatus is in the format not enabling the image forming unit to perform the image formation and transmitting the file determined to be in the format not enabling the image forming unit to perform the image formation to a file conversion server for converting the file to file in a format corresponding to the image forming unit.

9. The image forming apparatus according to 1, wherein a setting file indicating printing setting is stored in the specific folder.

10. The image forming apparatus according to claim 9, wherein the setting file is a job definition format (JDF).

11. The image forming apparatus according to claim 9, wherein the controller performs the process of setting, as an address of the file obtained from the external apparatus, a first address within the specific folder and performs the process of changing the address of the file to the second address different from the first address based on the setting file having been deleted.

12. The image forming apparatus according to claim 9, wherein the controller performs a process of generating print data based on the file obtained from the external apparatus and the setting file.

13. The image forming apparatus according to claim 1, wherein the controller performs a process of obtaining print data to which the print setting information is added from the external apparatus, and performs a process of causing the image forming unit to perform, in accordance of the print setting information, image formation based on the print data.

14. An image forming apparatus using an image forming unit configured to form an image on a sheet, the image forming apparatus comprising:
 a storage unit configured to store data, a plurality of folders being stored in the storage unit, the plurality of folders including a first folder and a second folder, the plurality of folders being accessible from an external apparatus, specific print setting being associated with the first folder, no print setting being associated with the second folder; and
 a controller having a processor executing instructions stored in a memory or having circuitry;
 wherein the controller obtains a first file requested to be stored into the first folder, registers a print job based on the first file by using the specific print setting, and causes the image forming unit to perform print processing based on the print job in accordance with a print instruction given by a user; and
 wherein the controller obtains a second file requested to be stored into the second folder, and stores the second file into the second folder without registering a print job based on the second file.

15. An image forming apparatus using an image forming unit configured to form an image on a sheet, the image forming apparatus comprising:
 a storage unit configured to store data, a specific folder being stored in the storage unit, the specific folder being accessible from an external apparatus, the specific folder being associated with first print setting; and
 a controller having a processor executing instructions stored in a memory or having circuitry;
 the controller obtains a file designated to be stored into the specific folder, registers a print job based on the file by using the first print setting, and causes the image forming unit to perform print processing based on the print job; and
 the controller obtains data for which no storage destination folder has been designated and to which second print setting has been assigned, registers a print job based on the data by using the second print setting, and causes the image forming unit to perform print processing based on the print job.

16. An image forming method using an image forming apparatus, the image forming apparatus having an image forming unit configured to form an image on a sheet, a controller having a processor executing instructions stored in a memory or having circuitry, and a storage unit configured to store data, a plurality of folders being stored in the storage unit, the plurality of folders including a first folder and a second folder, the plurality of folders being accessible from an external apparatus, specific print setting being associated with the first folder, no print setting being associated with the second folder, the method comprising:
 a process of obtaining, by the controller, a first file requested to be stored into the first folder, and causing the image forming unit to perform print processing based on the first file by using the specific print setting; and
 a process of obtaining, by the controller, a second file requested to be stored into the second folder, and storing the second file into the second folder without causing the image forming unit to perform print processing based on the second file.

17. An image forming method using an image forming apparatus, the image forming apparatus having an image forming unit configured to form an image on a sheet, a controller having a processor executing instructions stored in a memory or having circuitry, and a storage unit configured to store data, a plurality of folders being stored in the storage unit, the plurality of folders including a first folder and a second folder, the plurality of folders being accessible from an external apparatus, specific print setting being associated with the first folder, no print setting being associated with the second folder, the method comprising:
 a process of obtaining, by the controller, a first file requested to be stored into the first folder, registering a print job based on the first file by using the specific print setting, and causing the image forming unit to perform print processing based on the print job in accordance with a print instruction given by a user; and
 a process of obtaining, by the controller, a second file requested to be stored into the second folder, and storing the second file into the second folder without registering a print job based on the second file.

18. An image forming method using an image forming apparatus, the image forming apparatus having an image forming unit configured to form an image on a sheet, a controller having a processor executing instructions stored in a memory or having circuitry, and a storage unit configured to store data, a specific folder being stored in the storage unit, the specific folder being accessible from an external apparatus, the specific folder being associated with first print setting, the method comprising:
 a process of obtaining, by the controller, a file designated to be stored into the specific folder, registering a print job based on the file by using the first print setting, and causing the image forming unit to perform print processing based on the print job; and
 a process of obtaining, by the controller, data for which no storage destination folder has been designated and to which second print setting has been assigned, registering a print job based on the data by using the second print setting, and causing the image forming unit to perform print processing based on the print job.

* * * * *